(12) United States Patent
Galembeck et al.

(10) Patent No.: US 9,187,653 B2
(45) Date of Patent: *Nov. 17, 2015

(54) ALUMINUM PHOSPHATE, POLYPHOSPHATE, AND METAPHOSPHATE PARTICLES AND THEIR USE AS PIGMENTS IN PAINTS AND METHOD OF MAKING SAME

(75) Inventors: Fernando Galembeck, Campinas (BR); João de Brito, Cajati (BR)

(73) Assignees: BUNGE AMORPHIC SOLUTIONS LLC, White Plains, NY (US); UNIVERSIDADE ESTADUAL DE CAMPINAS, Campinas, São Paulo (BR)

( * ) Notice: Subject to any disclaimer, the term of this patent is extended or adjusted under 35 U.S.C. 154(b) by 562 days.

This patent is subject to a terminal disclaimer.

(21) Appl. No.: 12/844,625

(22) Filed: Jul. 27, 2010

(65) Prior Publication Data

US 2010/0292382 A1    Nov. 18, 2010

Related U.S. Application Data

(63) Continuation of application No. 11/364,798, filed on Feb. 27, 2006, now Pat. No. 7,763,359, which is a continuation-in-part of application No. 11/215,312, filed on Aug. 30, 2005, now abandoned.

(30) Foreign Application Priority Data

Aug. 30, 2004   (BR) ..................... 0403713

(51) Int. Cl.
    *C09D 7/12*    (2006.01)
    *C01B 25/36*   (2006.01)
    (Continued)

(52) U.S. Cl.
    CPC ............. *C09D 7/1216* (2013.01); *C01B 25/36* (2013.01); *C01B 25/40* (2013.01); *C01B 25/44* (2013.01);
    (Continued)

(58) Field of Classification Search
    CPC ................. C08K 2003/32; C08K 2003/327; C08K 3/32; C08K 2003/321; C08K 2003/322; C08K 2003/323; C01B 25/36; C01B 25/40; C01B 25/44; C09D 11/037; C09D 7/1216; C09D 7/1266; C09D 7/1275
    USPC ................................... 423/299, 304, 305, 344
    See application file for complete search history.

(56) References Cited

U.S. PATENT DOCUMENTS

| 1,654,404 A | 12/1927 | Blumenberg, Jr. |
| 2,222,196 A | 11/1940 | Vilkomerson |

(Continued)

FOREIGN PATENT DOCUMENTS

| BR | PI 9500522-6 | 6/2002 |
| BR | PI 9400746-2 | 7/2003 |

(Continued)

OTHER PUBLICATIONS

Nonfinal Office Action of parent U.S. Appl. No. 11/215,312 dated Mar. 2, 2007, total 11 pages.

(Continued)

*Primary Examiner* — Shuangyi Abu Ali
(74) *Attorney, Agent, or Firm* — Snell & Wilmer L.L.P.

(57) ABSTRACT

An aluminum phosphate composition comprising aluminum phosphate, aluminum polyphosphate, aluminum metaphosphate, or a mixture thereof. The composition may be characterized by, when in powder form, having particles wherein some of the particles have at least one or more voids per particle. In addition, the composition is characterized by exhibiting two endothermic peaks in Differential Scanning Calorimetry between about 90 degrees to about 250 degrees Celsius. The composition is also characterized by, when in powder form, having a dispersibility of at least 0.025 grams per 1.0 gram of water. The composition is made by a process comprising contacting phosphoric acid with aluminum sulfate and an alkaline solution to produce an aluminum phosphate based product; and optionally calcining the aluminum phosphate, polyphosphate or metaphosphate based product at an elevated temperature. The composition is useful in paints and as a substitute for titanium dioxide.

29 Claims, 7 Drawing Sheets

(51) Int. Cl.
*C01B 25/40* (2006.01)
*C01B 25/44* (2006.01)
*C09D 11/037* (2014.01)
*C08K 3/32* (2006.01)

(52) U.S. Cl.
CPC ............ *C09D 7/1266* (2013.01); *C09D 7/1275* (2013.01); *C09D 11/037* (2013.01); *C08K 3/32* (2013.01)

(56) References Cited

U.S. PATENT DOCUMENTS

| | | |
|---|---|---|
| 2,222,199 A | 11/1940 | Fleck |
| 2,909,451 A | 10/1959 | Lawler et al. |
| 3,394,987 A | 7/1968 | Lee et al. |
| 3,650,683 A | 3/1972 | Hloch et al. |
| 3,801,704 A | 4/1974 | Kobayashi et al. |
| 3,926,905 A | 12/1975 | Nose et al. |
| 3,943,231 A | 3/1976 | Wasel-Nielen et al. |
| 4,015,050 A | 3/1977 | Birchall |
| 4,054,678 A | 10/1977 | Benjamin et al. |
| 4,076,221 A | 2/1978 | Gröger |
| 4,078,028 A | 3/1978 | Kishi |
| 4,098,749 A | 7/1978 | Hoshino et al. |
| 4,111,884 A | 9/1978 | Takase et al. |
| 4,122,231 A | 10/1978 | Kishi |
| 4,127,157 A | 11/1978 | Gardikes et al. |
| 4,138,261 A | 2/1979 | Adrian et al. |
| 4,147,758 A | 4/1979 | Adrian et al. |
| 4,169,802 A | 10/1979 | Basile et al. |
| 4,171,984 A | 10/1979 | Hosaka et al. |
| 4,216,190 A | 8/1980 | Neely, Jr. |
| 4,227,932 A | 10/1980 | Leah et al. |
| 4,260,591 A | 4/1981 | Benjamin et al. |
| 4,319,926 A | 3/1982 | Nowakowski et al. |
| 4,321,244 A | 3/1982 | Magnier et al. |
| 4,328,033 A | 5/1982 | Boberski et al. |
| 4,329,327 A | 5/1982 | Neely, Jr. et al. |
| 4,333,914 A | 6/1982 | Neely, Jr. et al. |
| 4,364,854 A | 12/1982 | McDaniel et al. |
| 4,364,855 A | 12/1982 | McDaniel et al. |
| 4,375,496 A | 3/1983 | Nowakowski et al. |
| 4,383,866 A | 5/1983 | Nowakowski et al. |
| 4,395,387 A | 7/1983 | Goltz et al. |
| 4,418,048 A | 11/1983 | Dyer et al. |
| 4,435,219 A | 3/1984 | Greigger |
| 4,444,962 A | 4/1984 | McDaniel et al. |
| 4,444,965 A | 4/1984 | McDaniels et al. |
| 4,457,899 A * | 7/1984 | Grotyohann et al. ...... 423/321.2 |
| 4,482,380 A | 11/1984 | Schlegel |
| 4,487,862 A | 12/1984 | Maruya |
| 4,505,954 A | 3/1985 | Hokamura et al. |
| 4,518,513 A | 5/1985 | Lochner et al. |
| 4,542,001 A | 9/1985 | Iino et al. |
| 4,547,479 A | 10/1985 | Johnson et al. |
| 4,567,152 A | 1/1986 | Pine |
| 4,597,796 A | 7/1986 | Ernst et al. |
| 4,622,371 A | 11/1986 | McDaniel |
| 4,640,964 A | 2/1987 | Johnson et al. |
| 4,673,663 A | 6/1987 | Magnier |
| 4,717,701 A | 1/1988 | McDaniel |
| 4,743,572 A | 5/1988 | Angevine et al. |
| 4,746,568 A | 5/1988 | Matsumoto et al. |
| 4,758,281 A | 7/1988 | Eckler et al. |
| 4,767,802 A | 8/1988 | Sakakibara et al. |
| 4,782,109 A | 11/1988 | DuLaney et al. |
| 4,876,097 A | 10/1989 | Autant et al. |
| 4,888,056 A | 12/1989 | van der Kolk et al. |
| 4,898,660 A | 2/1990 | Wilson et al. |
| 4,972,002 A | 11/1990 | Volkert |
| 4,990,217 A | 2/1991 | Philippot et al. |
| 4,996,103 A | 2/1991 | Henn et al. |
| 5,028,684 A | 7/1991 | Neuhaus et al. |
| 5,030,431 A | 7/1991 | Glemza |
| 5,077,332 A | 12/1991 | Blattler et al. |
| 5,096,933 A | 3/1992 | Volkert |
| 5,108,755 A | 4/1992 | Daniels et al. |
| 5,158,610 A | 10/1992 | Bittner |
| 5,183,656 A | 2/1993 | Uesaka et al. |
| 5,208,271 A | 5/1993 | Gallagher |
| 5,242,744 A | 9/1993 | Schryer |
| 5,256,253 A | 10/1993 | Zidovec et al. |
| 5,296,027 A | 3/1994 | Ernst et al. |
| 5,374,411 A | 12/1994 | Davis et al. |
| 5,403,519 A | 4/1995 | Rittler |
| 5,486,232 A | 1/1996 | Griffith et al. |
| 5,488,016 A | 1/1996 | Rittler |
| 5,496,529 A | 3/1996 | Fogel et al. |
| 5,534,130 A | 7/1996 | Sekhar |
| 5,552,361 A | 9/1996 | Rieser et al. |
| 5,698,758 A | 12/1997 | Rieser et al. |
| 5,707,442 A | 1/1998 | Fogel et al. |
| 5,763,015 A | 6/1998 | Hasui et al. |
| 5,783,510 A | 7/1998 | Kida et al. |
| 5,883,200 A | 3/1999 | Tsuchiya et al. |
| 6,010,563 A | 1/2000 | Taketani et al. |
| 6,022,513 A * | 2/2000 | Pecoraro et al. ............... 423/311 |
| 6,117,373 A | 9/2000 | Kida et al. |
| 6,139,616 A | 10/2000 | Nagayama et al. |
| 6,177,489 B1 | 1/2001 | Okuse et al. |
| 6,316,532 B1 | 11/2001 | Nozaki et al. |
| 6,342,546 B1 | 1/2002 | Kato et al. |
| 6,409,951 B1 | 6/2002 | Inoue et al. |
| 6,447,741 B1 | 9/2002 | Chester et al. |
| 6,461,415 B1 | 10/2002 | Sambasivan et al. |
| 6,503,304 B2 | 1/2003 | Korn et al. |
| 6,547,870 B1 | 4/2003 | Griessmann et al. |
| 6,562,474 B1 | 5/2003 | Yoshimi et al. |
| 6,589,324 B2 | 7/2003 | Kamo et al. |
| 6,635,192 B1 | 10/2003 | Schwarz |
| 6,646,058 B1 | 11/2003 | Koger |
| 6,669,816 B1 | 12/2003 | Poch et al. |
| 6,677,053 B2 | 1/2004 | Yamaji et al. |
| 6,749,769 B2 | 6/2004 | Gai |
| 6,784,236 B2 | 8/2004 | Sugita et al. |
| 6,797,155 B1 | 9/2004 | Chester et al. |
| 6,838,506 B2 | 1/2005 | Nakao et al. |
| 6,881,782 B2 | 4/2005 | Crater et al. |
| 6,927,185 B2 | 8/2005 | Yamanaka et al. |
| 7,101,820 B2 | 9/2006 | Gai |
| 7,311,944 B2 | 12/2007 | Sambasivan et al. |
| 7,438,881 B2 | 10/2008 | Staffel et al. |
| 7,678,465 B2 | 3/2010 | Sambasivan et al. |
| 7,682,700 B2 | 3/2010 | Sambasivan et al. |
| 2001/0031316 A1 | 10/2001 | Nozaki et al. |
| 2002/0031679 A1 | 3/2002 | Yano et al. |
| 2002/0040557 A1 | 4/2002 | Felton |
| 2002/0158230 A1 | 10/2002 | Bortnik |
| 2003/0113486 A1 | 6/2003 | Sakai et al. |
| 2003/0138673 A1 | 7/2003 | Sambasivan et al. |
| 2004/0011245 A1 | 1/2004 | Sambasivan et al. |
| 2004/0063815 A1 | 4/2004 | Kinose et al. |
| 2004/0071887 A1 | 4/2004 | Newton |
| 2004/0092637 A1 | 5/2004 | McClanaham |
| 2004/0138058 A1 | 7/2004 | Sambasivan et al. |
| 2004/0261909 A1 | 12/2004 | Hamada |
| 2005/0106384 A1 | 5/2005 | Sambasivan et al. |
| 2006/0045831 A1 | 3/2006 | Galembeck et al. |
| 2006/0057407 A1 | 3/2006 | Sambasivan et al. |
| 2006/0211798 A1 | 9/2006 | Galembeck et al. |
| 2007/0215005 A1 | 9/2007 | Nicolai et al. |
| 2008/0038556 A1 | 2/2008 | Galembeck et al. |
| 2008/0085965 A1 | 4/2008 | Imakita et al. |
| 2009/0064893 A1 | 3/2009 | Sambasivan et al. |
| 2009/0149317 A1 | 6/2009 | Stamires et al. |
| 2009/0217841 A1 | 9/2009 | Galembeck et al. |
| 2010/0180801 A1 | 7/2010 | Thauern et al. |

FOREIGN PATENT DOCUMENTS

| | | |
|---|---|---|
| BR | PI 9104581-9 | 8/2003 |
| EP | 0 492 137 A2 | 7/1992 |
| EP | 0 598 464 A1 | 5/1994 |
| EP | 0 753 546 A2 | 1/1997 |

(56) References Cited

FOREIGN PATENT DOCUMENTS

| | | |
|---|---|---|
| EP | 0 837 031 A2 | 4/1998 |
| EP | 1 241 131 B1 | 9/2002 |
| EP | 1 878 700 | 1/2008 |
| FR | 2 157 866 | 6/1973 |
| GB | 0 517 258 | 1/1940 |
| GB | 1 379 562 A | 1/1975 |
| GB | 1 403 242 | 8/1975 |
| GB | 2 038 791 A | 7/1980 |
| GB | 2 042 573 A | 9/1980 |
| JP | 53-19345 | 1/1978 |
| JP | 53-59725 | 5/1978 |
| JP | 55-160059 | 12/1980 |
| JP | 56-32553 | 4/1981 |
| JP | 56-32554 | 4/1981 |
| JP | 56-32555 | 4/1981 |
| JP | 56-32556 | 4/1981 |
| JP | 56-131671 | 10/1981 |
| JP | 57-158267 | 9/1982 |
| JP | 60-215091 | 10/1985 |
| JP | 61-101566 | 5/1986 |
| JP | 61-286209 | 12/1986 |
| JP | 62-4753 | 1/1987 |
| JP | 63-101454 | 5/1988 |
| JP | 1-110567 | 4/1989 |
| JP | 1-167381 | 7/1989 |
| JP | 1-234475 | 9/1989 |
| JP | 1-249638 | 10/1989 |
| JP | 4-90874 | 3/1993 |
| JP | 6-179866 | 6/1994 |
| JP | 6-286054 | 10/1994 |
| JP | 7-241954 | 9/1995 |
| JP | 7-330451 | 12/1995 |
| JP | 8-72197 | 3/1996 |
| JP | 8-268704 | 10/1996 |
| JP | 8-283619 | 10/1996 |
| JP | 10-139923 | 5/1998 |
| JP | 10-213374 | 8/1998 |
| JP | 10-235782 | 9/1998 |
| JP | 11-147261 | 2/1999 |
| JP | 2001-189127 | 4/2001 |
| JP | 2001-329221 | 11/2001 |
| WO | 2006024959 A2 | 3/2006 |
| WO | 2007104465 A2 | 9/2007 |
| WO | 2008017135 A1 | 2/2008 |
| WO | 2009100510 A2 | 8/2009 |

OTHER PUBLICATIONS

Final Office Action of parent U.S. Appl. No. 11/215,312 dated Aug. 22, 2007, total 6 pages.
Nonfinal Office Action of parent U.S. Appl. No. 11/215,312 dated Dec. 31, 2007, total 7 pages.
Final Office Action of parent U.S. Appl. No. 11/215,312 dated Jul 11, 2008, total 6 pages.
Nonfinal Office Action of parent U.S. Appl. No. 11/215,312 dated Dec 19, 2008, total 7 pages.
Final Office Action of parent U.S. Appl. No. 11/215,312 dated Aug 12, 2009, total 8 pages.
Nonfinal Office Action of continuation-in-part U.S. Appl. No. 11/364,798 dated Aug 20, 2007, total 9 pages.
Final Office Action of continuation-in-part U.S. Appl. No. 11/364,798 dated Feb. 22, 2008, total 11 pages.
Advisory Action of continuation-in-part U.S. Appl. No. 11/364,798 dated Jun. 12, 2008, total 4 pages.
Nonfinal Office Action of continuation-in-part U.S. Appl. No. 11/364,798 dated Jul. 28, 2008, total 12 pages.
Final Office Action of continuation-in-part U.S. Appl. No. 11/364,798 dated Jan. 26, 2009, total 13 pages.
Nonfinal Office Action of continuation-in-part U.S. Appl. No. 11/364,798 dated Oct. 13, 2009, total 15 pages.
International Search Report and Written Opinion of corresponding International Application No. PCT/IB2005/003349 dated Mar. 3, 2006; total 12 pages.
European Search Report of corresponding European Application No. 07003938.3 dated May 18, 2007, total 7 pages.
Beppu et al; Aluminum Phosphate Particles Containing Closed Pores: Preparation, Characterization, and Use as a White Pigment; Journal of Colloid and Interface Science; vol. 178; Article No. 0097; 1996; pp. 93-103, XP002368235; ISSN: 0043-9088.
Beppu et al; Self-Opacifying Aluminum Phosphate Particles for Paint Film Pigmentation; Journal of Coatings Technology; vol. 69, No. 867, Apr. 1997; pp. 81-88; XP009061770; ISSN: 0361-8773.
Burrell et al; Aluminium Phosphate Adjuvants Prepared by Precipitation at Constant pH. Part I: Composition and Structure, Vaccine 19 (2001) 275-281.
Burrell et al; Aluminium Phosphate Adjuvants Prepared by Precipitation at Constant pH. Part II: Physicochemical Properties, Vaccine 19 (2001) 282-287.
Faison et al.; Use of Polyphosphates as Deflocculants of Alumina; Ceramic Engineering & Science Proceedings; vol. 12[1-2]; 1991; pp. 106-115.
Filho et al; Genesis of a Solid Foam: Iron (III) Metaphosphate Transformation in Sol-Gel Crystallization Processes, Langmuir 1990, 6, pp. 1013-1016.
Lima et al; Nanosized Particles of Aluminum Polyphosphate, Langmuir, vol. 12, No. 7, pp. 1701-1703, 1996.
Lima et al; Non-Crystalline Aluminum Polyphosphates: Preparation and Properties, J. Braz. Chem. Soc.; vol. 7, No. 3; 1996; pp. 2009-2215.
Lima et al; Particles of Aluminum Metaphosphate Containing Closed Pores. Preparation, Characterization and Optical Properties, Colloids and Surfaces A: Physicochemical and Engineering Aspects, vol. 75; 1993; pp. 65-74.
Monteiro et al; Aluminum Polyphosphate Nanoparticles: Preparation, Particle Size Determination, and Microchemistry, Journal of Colloid and Interface Science; vol. 217, Article 10; 1999; pp. 237-248; jcis.1999.6381, http://www.idealibrary.com.
Rosseto et al.; Hydrous Non-Crystalline Phosphates: Structure, Function and a new White Pigment; J. Braz. Chem. Soc.; vol. 17, No. 8; Jun. 2006; pp. 1465-1472; XP002432072; ISSN: 0103-5053.
Souza et al; Formation of Opaque Films by Biomimetic Process, J. Mat. Sci.; vol. 32; 1997; pp. 2207-2213; XP002432073.
Souza et al; Improved Latex Film—Glass Adhesion Under Wet Environments by Using and Aluminum Polyphosphate Filler; 1998; pp. 358-377.
Yang et al; Experimental Observations of Water—Framework Interactions in a Hydrated Microporous Aluminum Phosphate, J. Phys. Chem. B.; vol. 109, 2005; pp. 4464-4469.
WPI Database Search Results, Derwent Publications Ltd., London, GB, 2006.

\* cited by examiner

ALUMINUM PHOSPHATE, POLYPHOSPHATE, AND METAPHOSPHATE PARTICLES AND THEIR USE AS PIGMENTS IN PAINTS AND METHOD OF MAKING SAME

CROSS-REFERENCE TO RELATED APPLICATIONS

This application is a continuation of application Ser. No. 11/364,798, filed Feb. 27, 2006, now U.S. Pat. No. 7,763,359, which is a continuation-in-part of application Ser. No. 11/215,312, filed Aug. 30, 2005, now abandoned, which claims priority to Application No. PI0403713-8, filed in Brazil on Aug. 30, 2004, which are all incorporated by reference herein in their entirety.

BACKGROUND

1. Field of the Invention

The invention relates to methods of making particles of aluminum phosphate, aluminum metaphosphate, aluminum orthophosphate and aluminum polyphosphate. This invention further relates to use of such particles as pigments in paints and other applications.

2. Background of the Invention

Titanium dioxide is the most common white pigment due to its strong ability to backscatter visible light, which is in turn dependent on its refractive index. Substitutes for titanium dioxide have been sought, but the refractive indexes of both the anatase and rutile forms of this oxide are much higher than those of any other white powder, due to structural reasons.

Titanium dioxide pigments are insoluble in coating vehicles in which they are dispersed. The performance properties of such titanium dioxide pigments, including its physical and chemical characteristics, are determined by the particle size of the pigment and the chemical composition of its surface. Titanium dioxide is commercially available in two crystal structures: anatase and rutile. Rutile titanium dioxide pigments are preferred as they scatter light more efficiently and are more stable and durable than anatase pigments. Titanium dioxide scatters light very efficiently due to its large refractive index. The decorative and functional attributes of titanium dioxide, due to its scattering capabilities, make it a highly desirable pigment. However, titanium dioxide is known to be an expensive pigment to manufacture. Accordingly, there is a need for a more affordable substitute for titanium dioxide as a pigment.

As mentioned, a desired feature of titanium dioxide is its large capacity of spreading (or scattering) the visible light. This property is the result of its high refraction index, together with the absence of electronic transitions in the visible part of the spectrum. Many attempts have been carried out to replace the titanium dioxide, partially or totally in its applications as pigment. However, the refraction indices of its two forms, anatase and rutile, are difficult to obtain by other white solid substances (Handbook of Chemistry and Physics, CRC Press, 57th ed., 1983). Thus, the search for new white pigments led to the search of systems with other light spreading mechanism. Multiphase media, which present a large variation of the refraction index, may operate as light spreaders.

The current options for manufacturing processes of pigments or paints that result in a film containing "pores" in the internal part of the particles or between the particles and the resin is also quite limited. Some techniques for hollow particle preparation have been described in the literature, however, most techniques involve the manufacturing of spheroidal hollow and polymeric particles by polymerization in emulsion. An example is the study of N. Kawahashi and E. Matijevic (Preparation of Hollow Spherical Particle of Itrium Compounds, J Colloid and Interface Science 143(1), 103, 1991) on the coating of the polystyrene latex with basic itrium carbonate and subsequent calcination in high air temperatures, producing hollow particles of itrium compounds.

The preparation of hollow particles of aluminum metaphosphates by chemical reaction between the sodium metaphosphate and aluminum sulfate, followed by thermal treatment, was described by Galembeck et al. in Brazilian Patent BR 9104581. This study referred to the formation of hollow particles of aluminum phosphate synthesized from sodium phosphate and aluminum nitrate. As mentioned, the two pigments, aluminum phosphate and metaphosphate, can be used to replace a large part of $TiO_2$ in paints based on PVA latex or acrylic emulsions.

Brazilian Patent BR 9500522-6 of Galembeck et al. describes a way of making a white pigment from a double aluminum and calcium metaphosphate, obtained directly by a chemical reaction between the aluminum metaphosphate and calcium carbonate particles in a polymeric latex emulsion type aqueous medium. This patent extended the previous results to calcium salts that, from the environmental point of view, are advantageous due to their full atoxicity.

Several publications discuss the synthesis of aluminum phosphate materials primarily for use as a catalyst support including crystalline and amorphous forms. Many of these methods yield highly porous and crystalline forms and few thermally stable amorphous compositions. Examples of such materials are described in U.S. Pat. Nos. 3,943,231; 4,289,863; 5,030,431; 5,292,701; 5,496,529; 5,552,361; 5,698,758; 5,707,442; 6,022,513; and 6,461,415. There exists a need, however, for aluminum phosphate with hollow particles, particularly for a powder that could be manufactured with relative ease.

SUMMARY

The subject of this invention is an aluminum phosphate composition comprising aluminum phosphate, aluminum polyphosphate, aluminum metaphosphate, or a mixture thereof. The composition may be characterized by, when in powder form, having particles wherein some of the particles have at least one or more voids per particle. In addition, the composition is characterized by exhibiting two endothermic peaks in Differential Scanning Calorimetry between about 90 degrees to about 250 degrees Celsius. The composition is also characterized by, when in powder form, having a dispersibility of at least 0.025 grams per 1.0 gram of water.

DESCRIPTION OF EMBODIMENTS OF THE INVENTION

Figures 1A, 1B:
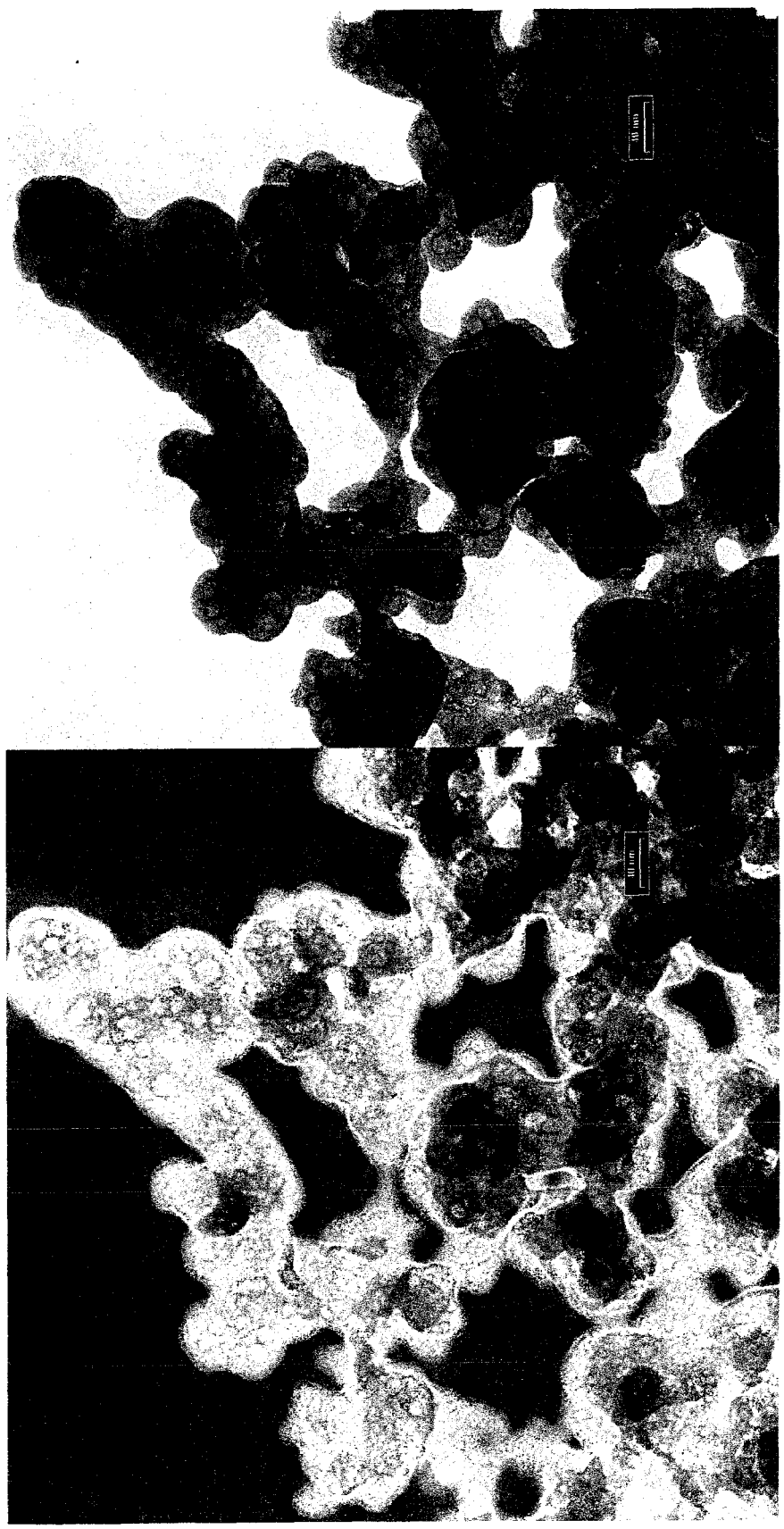
FIG. 1a is an energy filtered image of an inventive material from the transmission electron microscope.
FIG. 1b is a bright field image of an inventive material from the transmission electron microscope.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

The invention described in this patent relates to aluminum phosphate composition comprising aluminum phosphate, aluminum polyphosphate, aluminum metaphosphate, or a mixture thereof. The terms "aluminum phosphate" and "aluminum phosphate composition," as used herein, are meant to include both aluminum phosphate as well as aluminum polyphosphate, aluminum metaphosphate, and mixtures thereof. The aluminum phosphate composition is characterized by, when in powder form, having a dispersibility of at least 0.025 grams per 1.0 gram of water. Preferably, composition is characterized by, when in powder form, having a dispersibility of at least 0.035 grams per 1.0 gram of water. Even more preferably, the composition is characterized by, when in powder form, having a dispersibility of at least 0.05 grams per 1.0 gram of water.

The novel aluminum phosphate hollow particles may be generally characterized by several different characteristics. For example, the aluminum phosphate, when prepared in powder form, includes particles of which some of the particles have at least one void per particle, on the average. In addition, when the aluminum phosphate, polyphosphate and/or metaphosphate is in powder form, samples subjected to a differential scanning calorimetry test will demonstrate two distinct endothermic peaks, said peaks occurring generally between 90° Celsius and 250° Celsius. Preferably, the first peak occurs at approximately between the temperatures of approximately 96° Celsius and 116° Celsius, and the second peaks occurs at approximately between the temperatures of 149° Celsius and 189° Celsius. Even more preferably, the two peaks occur at approximately 106° Celsius and approximately 164° Celsius. In addition, the aluminum phosphate typically exhibits excellent dispersibility characteristics, as described herein.

The inventive composition is comprised of non-crystalline solids, as opposed to the large majority of inorganic industrial chemicals, including those products currently sold as crystalline aluminum phosphates or polyphosphates. The CAS number most often given for aluminum phosphate products is 7784-30-7, but this refers to a stoichiometric, crystalline solid. The invention described in this patent further relates to a novel aluminum phosphate, aluminum polyphosphate, aluminum metaphosphate, or mixture thereof.

Amorphous (i.e., non-crystalline) solids exhibit differences from their crystalline counterparts with a similar composition, and such differences may yield beneficial properties. For example, such differences may include: (i) the non-crystalline solids do not diffract x-rays at sharply defined angles but may produce a broad scattering halo instead; (ii) the non-crystalline solids do not have well defined stoichiometry, thus they can cover a broad range of chemical compositions; (iii) the variability of chemical composition includes the possibility of incorporation of ionic constituents other than aluminum and phosphate ions; (iv) as amorphous solids are thermodynamically meta-stable, they may demonstrate a tendency to undergo spontaneous morphological, chemical and structural changes; and (v) the chemical composition of crystalline particle surface and bulk is highly uniform while the chemical composition of surface and bulk of amorphous particles may show large or small differences, either abrupt or gradual. In addition, while particles of crystalline solids tend to grow by the well-known mechanism of Ostwald ripening, non-crystalline particles may expand or swell and shrink (de-swell) by water sorption and desorption, forming a gel-like or plastic material that is easily deformed when subjected to shearing, compression or capillary forces.

As mentioned, one aspect of the invention described herein is a synthetic process that produces non-crystalline nano-sized aluminum phosphate particles with unique properties. When a dispersion of such particles dries under air at room temperature or up to 120° C., dry particles form that have a core-and-shell structure. Such particles may be observed by analytical electron microscopy. Moreover, these particles contain many voids dispersed as closed pores in their interior. The cores of the particles are more plastic than the respective shells of the particles. This phenomenon is evidenced by growth of the voids upon heating, while the perimeter of the shells remains essentially unaltered.

Another aspect of the invention consists of the development of a new product and manufacturing process to form hollow particles of aluminum phosphate, aluminum polyphosphate and aluminum metaphosphate (and mixtures thereof) to be used as a pigment. More specifically, this aspect of the invention relates to a new pigment obtained through the reaction of the phosphoric acid, particularly industrial-grade phosphoric acid, with aluminum sulfate under controlled pH and temperature conditions. The reactant may be filtered, dispersed, dried, calcinated, and micronized for usage as pigment in paints, including in house acrylic paints. Such pigments may be used in other products and applications, such as paints, plastics, varnishes, printing inks, etc.

As described herein, many have sought the formation of voids within particles, but it is a difficult objective to obtain because the majority of solids form open pores upon drying, and such open pores do not contribute to paint opacity or hiding power. The hollow particles formed within aluminum phosphate, polyphosphate or metaphosphate confer beneficial characteristics, both physically and chemically, that can be used in many different applications. One aspect of the inventions described herein is to produce aluminum phosphate, polyphosphate or metaphosphate (or combinations thereof) with such hollow particles in order to take advantage of such beneficial characteristics.

Figures 2A, 2B:
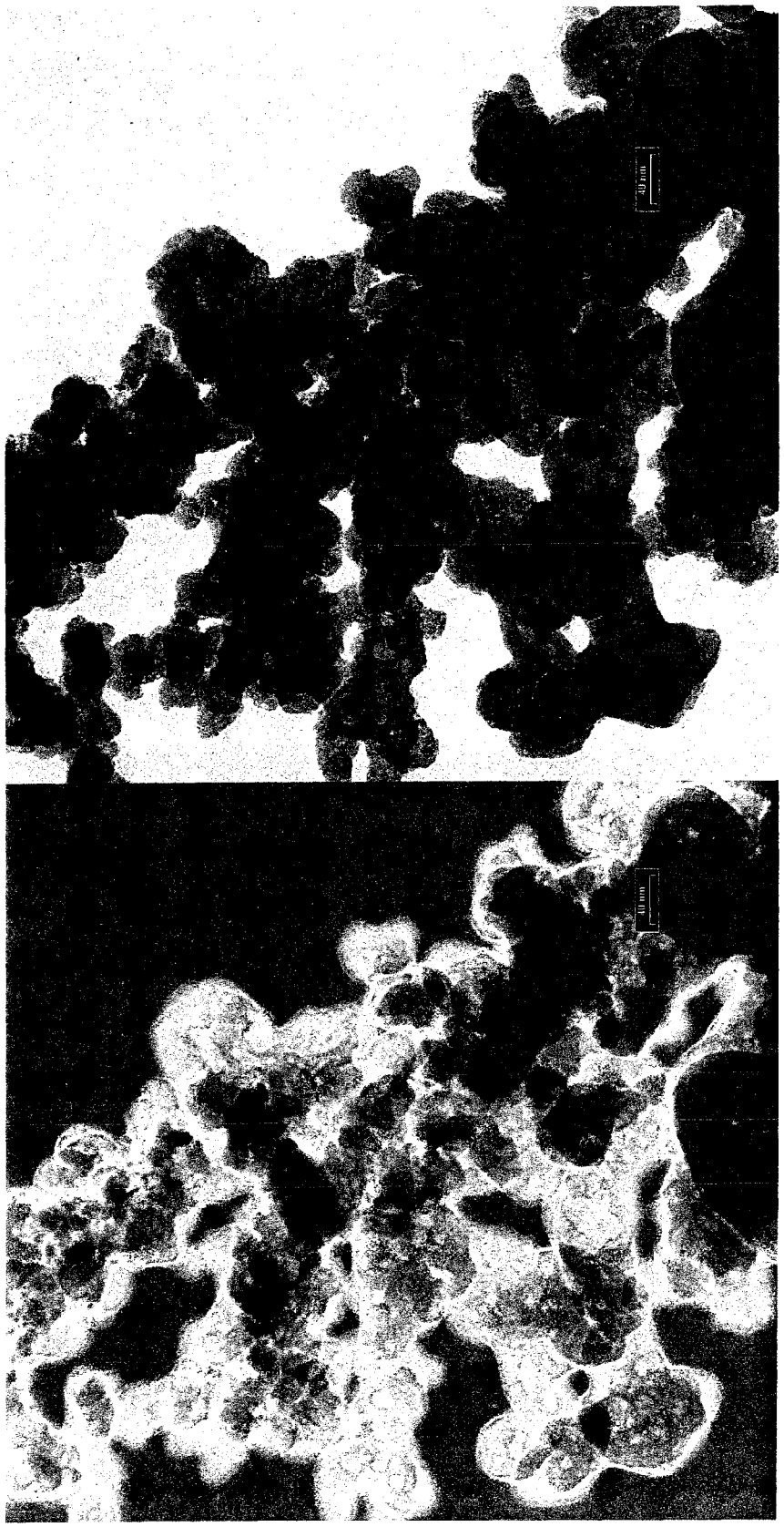
FIG. 2a is an energy filtered image of an inventive material from the transmission electron microscope.
FIG. 2b is a bright field image of an inventive material from the transmission electron microscope.
Figure 3B:
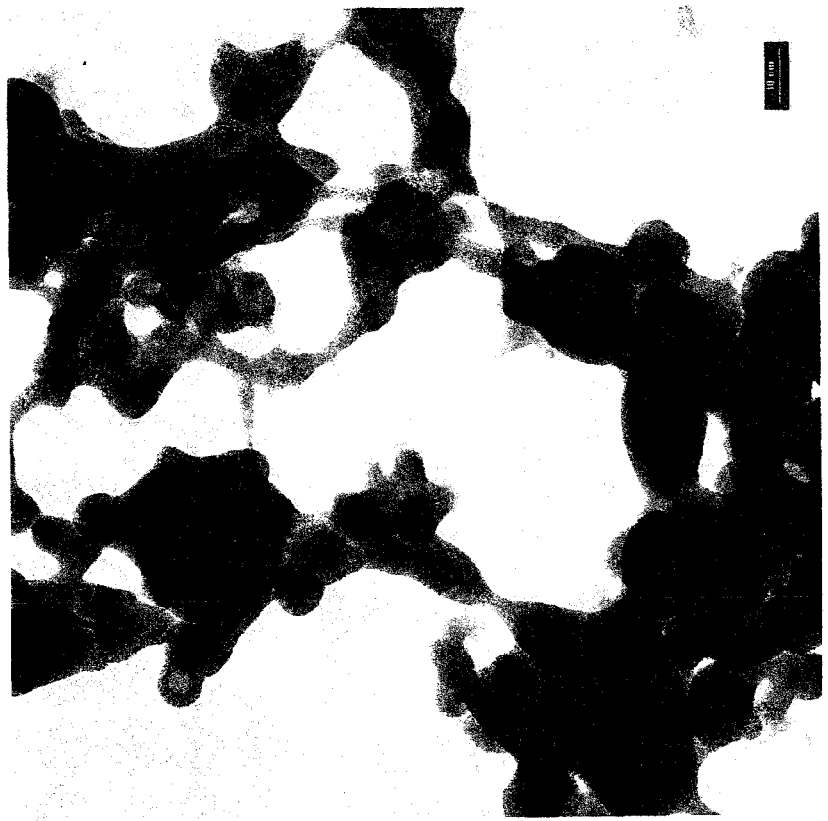
FIG. 3b is a bright field image from a transmission electron microscope demonstrating an aluminum phosphate-based product that is absent of voids.
Figure 3A:
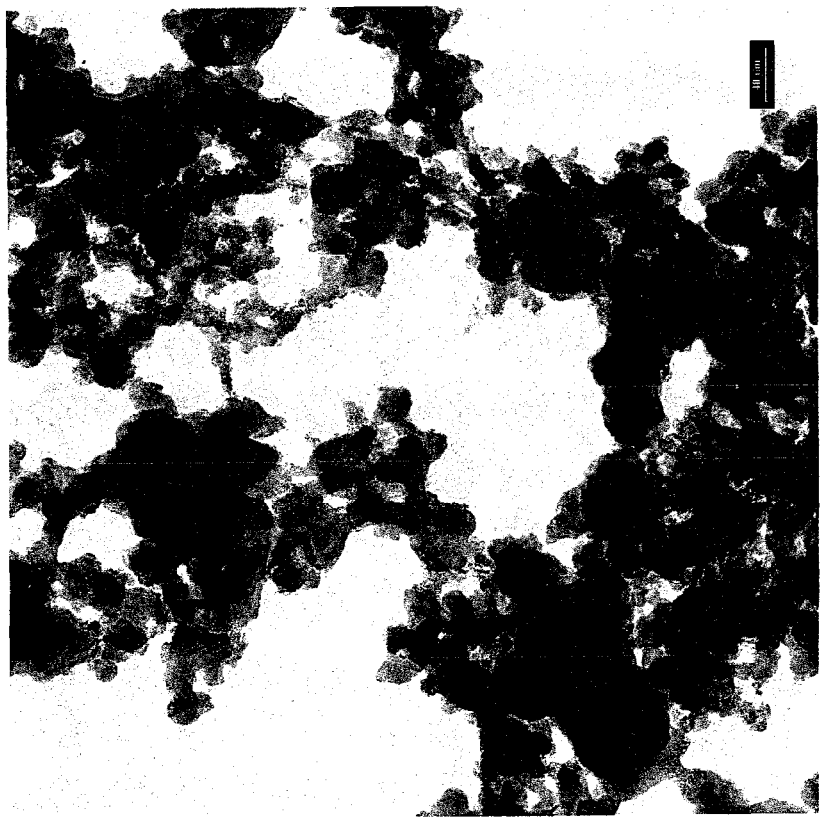
FIG. 3a is a bright field image from a transmission electron microscope demonstrating an aluminum phosphate-based product that is absent of voids.

The term "void" referred to herein is generally synonymous with the term "hollow particle," and is also described herein as a "closed void." The void (or closed void or hollow particle) is part of a core and shell structure of the aluminum phosphate mixture. A sample of the inventive composition, as viewed under an energy-filtered image from a transmission electron microscope is shown in FIGS. 1a and 2a. A sample of the inventive composition, as viewed under a bright field transmission electron photomicroscope, is shown in FIGS. 1b and 2b. The sample demonstrates the voids contained in the inventive composition. By contrast, FIGS. 3a and 3b are bright field transmission electron photomicrographs of an aluminum phosphate sample containing no voids. The light scattering ability of the samples in FIGS. 1a, 1b, 2a and 2b are superior to the light scattering ability of the sample in FIGS. 3a and 3b.

The voids may be observed and/or characterized using either transmission or scanning electron microscopes ("TEMs" or "SEMs"). The use of TEMs or SEMs are well known to those of skill in the art. Generally, optical microscopy is limited, by the wavelength of light, to resolutions in the range of a hundred, and usually hundreds, of nanometers. TEMs and SEMs do not have this limitation and are able to attain a considerably higher resolution, in the range of a few nanometers. An optical microscope uses optical lenses to focus light waves by bending them, while an electron microscope uses electromagnetic lenses to focus beams of electrons by bending them. Beams of electrons provide great advantages over beams of light both in control of magnification levels and in the clarity of the image that can be produced. Scanning electron microscopes complement transmission electron microscopes in that they provide a tool to obtain the three dimensional image of the surface of a sample.

Generally, a beam of electrons is produced in an electron microscope by heating a filament. The filament can be made of a variety of metallic materials, including, but not limited to, tungsten or lanthanum hexaboride. This metallic filament functions as the cathode, and when a voltage is applied, the temperature of the filament is increased. An anode, which is positive with respect to the filament, forms a powerful attractive force for electrons. Electrons are attracted from the cathode to the anode, with some passing by the anode to form the electron beam that is used in imaging the sample.

This electron beam is then condensed, and focused onto the sample by using electromagnetic lenses. In an SEM, scan coils create a magnetic field that can be varied to direct the beam back and forth across the sample in a controlled manner. The same varying voltage that creates the pattern on the sample is applied to a cathode-ray tube. This creates a pattern of light on the surface of the cathode ray tube that is analogous to the one on the sample.

As mentioned, the inventive material has novel characteristics that are reflected in tests run on a differential scanning calorimeter. Briefly, differential scanning calorimetry ("DSC") is an analytical technique in which the heat flow associated with a chemical, physical or crystallographic transformation in a material is measured as a function of temperature and time (and possibly pressure). Differential scanning calorimeters ("DSCs") measure the heat flow to a sample as the sample temperature is varied in a controlled manner. There are two basic types of DSCs, heat flux and power compensation. Heat flux DSCs include a sensor to measure heat flow to a sample to be analyzed. The sensor has a sample position and a reference position. The sensor is installed in an oven whose temperature is varied dynamically according to a desired temperature program. As the oven is heated or cooled, the temperature difference between the sample and reference positions of the sensor is measured. This temperature difference is assumed to be proportional to the heat flow to the sample.

Power compensation DSCs include a sample and a reference holder installed in a constant temperature enclosure. Each of the holders has a heater and a temperature sensor. The average of the sample and reference holder temperatures is used to control temperature, which follows the desired temperature program. In addition, differential power proportional to the temperature difference between the holders is added to the average power to the sample holder and subtracted from the average power to the reference holder in an effort to reduce the temperature difference between sample and reference holders to zero. The differential power is assumed to be proportional to the sample heat flow and is obtained by measuring the temperature difference between the sample and reference holder. In commercial power compensation DSCs, the difference between sample and reference temperature is generally not zero because a proportional controller is used to control the differential power.

A sample to be analyzed is loaded into a pan and placed on the sample position of the DSC. An inert reference material may be loaded into a pan and placed on the reference position of the DSC, although usually the reference pan is empty. The temperature program for conventional DSCs typically includes combinations of linear temperature ramps and constant temperature segments. The experimental result is the sample heat flow versus temperature or time. The heat flow signal is the result of heat flow to or from the sample due to its specific heat and as a result of transitions occurring in the sample.

During the dynamic portion of the DSC experiment, a temperature difference is created between the sample and reference positions of the DSC. In heat flux DSCs, the temperature difference results from the combination of three differential heat flows: the difference between the sample and reference heat flow, the difference between sample and reference sensor heat flow and the difference between sample and reference pan heat flow. In power compensation DSCs, the temperature difference results from the combination of three differential heat flows plus the differential power supplied to the sample holders: the difference between the sample and reference heat flow, the difference between sample and reference holder heat flow and the difference between sample and reference pan heat flow. The heat flow difference between the sample and reference consists of heat flow due to the heat capacity difference between the sample and reference or the heat flow of a transition. The heat flow difference between the sample and reference sections of the DSC is the result of thermal resistance and capacitance imbalances in the sensor or between the holders and the difference in heating rate that occurs between the sample and reference sections of the DSC during a transition. Similarly, the heat flow difference between the sample and reference pans is the result of mass differences between the pans and the difference in heating rate that occurs during a sample transition.

In conventional heat flux DSCs, the sensor imbalance and pan imbalance are assumed to be insignificant and the differences in heating rates are ignored. In conventional power compensation DSCs, the holder imbalance and pan imbalance are assumed to be insignificant and the differences in heating rates are ignored. When the balance assumptions are satisfied and the sample heating rate is the same as the programmed heating rate, the temperature difference is proportional to the sample heat flow and the differential temperature gives an accurate measure of the sample heat flow. The sample heat flow is only proportional to the measured temperature difference between the sample and reference when the heating rate of the sample and reference are identical, the sensor is perfectly symmetrical, and the pan masses are identical. Proportionality of sample heat flow to temperature difference for a balanced sensor and pans occurs only during portions of the experiment when the instrument is operating at a constant heating rate, the sample is changing temperature at the same rate as the instrument and there are no transitions occurring in the sample.

During a transition, the heat flow to the sample increases or decreases from the pre-transition value depending upon whether the transition is endothermic or exothermic and whether the DSC is being heated or cooled. The change in sample heat flow causes the heating rate of the sample to be different from that of the DSC and as a consequence, the sample pan and sensor heating rates become different from the programmed heating rate.

Various samples of the aluminum phosphate, polyphosphate and/or metaphosphate product were tested on a DSC. The DSC results obtained herein are determined using a TA Instruments model Q Series 600 DSC equipped with an RCS cooling accessory and an auto-sampler. A nitrogen purge gas flow of 50 ml/min is used. Aluminum phosphate cake or slurry samples were dried by heating at 110° Celsius to constant weight. Alternatively, the standard set forth in ASTM D-280 could be followed to achieve similar results. The resulting dried powder sample is weighed (approximately 4 mg) in an open aluminum pan (model DSC Q10). The pan is then mounted in the DSC apparatus and heated from room temperature up to 420° Celsius at 10° Celsius per minute heating rate. The DSC curve is examined and the temperatures of heat flow rate maxima (W/g) with respect to sigmoidal baseline drawn between room temperature and 420° Celsius are recorded. The heat absorbed by the sample is measured as the area under the curve in the temperature range used.

To simplify calculations on the DSC, a sigmoidal baseline is used. Although a straight line may be adequate when the heat capacities of the solid and liquid phases do not vary dramatically, typically a sigmoidal baseline is created to define the lower limit of the area under the DSC curve. This is necessary due to the fact that the slope of the baseline, representing heat capacity, changes with a phase transformation, and therefore, the use of a linear baseline may lead to significant errors. A sigmoidal baseline is an S-shaped curve that undergoes a change in level and/or slope either before or after a peak. It is used as a compensation for any change in baseline which may occur during a phase transition. The baseline undergoes adjustment for the fraction reacted versus time. The sigmoidal baseline is calculated, initially, as a straight line from the peak start to the peak end. It is then recalculated for each data point between peak limits as the weighted average between the projected horizontal or tangent baselines at peak start and peak end.

Table 1 reflects results of various tests performed on samples of aluminum phosphate, including data obtained from samples tested on a DSC. The first column of Table 1 is the sample number. The second column of Table 1 reflects the phosphorus to aluminum mole ratio of the resulting mixture. The third column of Table 1 reflects the phosphorus to sodium mole ratio of the mixtures. The fourth column of Table 1 reflects the aluminum to sodium mole ratio of the mixtures. Phosphorus, aluminum and sodium ratios were determined by inductively-coupled plasma optical emission spectrometry ("ICP-OES"), model Optima 3000 DV, Perkin Elmer. Approx. 100 mg of an inventive slurry were dissolved in 1.5 g of HCl (3 M) and 100 g of water were added. The final solutions were filtered and the ICP measurements were done. The ICP is an Argon plasma maintained by the interaction of a radio frequency (RF) field and ionized argon gas. In the ICP-OES, plasma is used as an energy source, producing heat of 5500°-8000° K and up to 10000° K in some regions, enough to ionize and excite most analyte atoms. Upon the electron's decay to its ground state, light is emitted and detected. Because the excited ion only emits light of certain wavelengths, spectral lines dependent on the element are produced. These lines can then be used to qualitatively determine the components of the sample. A calibration curve of spectra intensity and centration can be used to quantitatively determine the concentration of analyte in the sample.

The fifth and sixth columns of Table 1 reflect the temperatures at which the peaks are located with respect to the tests performed on the DSC, as described herein. The seventh column reflects the integration of the curves generated by the measurement of heat flow from the DSC. The remaining three columns reflect the ratios between opacity, whiteness and yellowness indices of the paints made replacing 50% of titanium oxide with aluminum phosphate to the standard paint.

The opacity index is measured pursuant to ASTM standard D 2805-96a, while the whiteness and yellowness indices were measured pursuant to ASTM standard E 313-00. Optical measurements (opacity, whiteness and yellowness) were measured with a BYK-Gardner Colorimeter model color-guide sphere d/8° spin. Leneta charts with drawdowns prepared according to ASTM D2805, using paints formulated with the inventive composition described herein and $TiO_2$. Color-guide is a portable spectrophotometer which can be used to ensure consistent quality in in-coming and outgoing quality control in on-site process control. It is operated with batteries to meet the demands of measurements in the field. The measurement principle is based on the measurement of spectral reflectance within the visible spectrum of wavelengths from 400-700 nm. Two measurements geometries are provided: 45/0 and d/8 (with or without specular gloss). With 45/0, illumination occurs in a circular pattern at an angle of 45°, while the observation angle is 0°. With d/8, light falls on the sample in a diffuse manner, while the observation angle is 8° "from the vertical". The instrument color guide gloss measures (d/8) and 60° simultaneously. The sample is illuminated by light-emitting diodes (LEDs) with high lifetime expectation. LEDs do not warm the sample, so there is no risk of thermochromic effects caused by illumination.

TABLE 1

Results of Various Tests Performed on the Samples of Aluminum Phosphate

| Sample | P/Al | P/Na | Al/Na | T1 peak | T2 peak | Integral Heat flow | Opacity Index Ratio | Whiteness Ratio | Yellowness Ratio |
|---|---|---|---|---|---|---|---|---|---|
| 1 | 1.30 | 2.15 | 1.65 | 114.0 | 183.0 | 279.30 | 1.01 | 1.03 | 0.91 |
| 2 | 1.29 | 1.84 | 1.42 | 114.0 | 185.0 | 280.85 | 0.99 | 1.04 | 0.92 |
| 3 | 1.31 | 2.19 | 1.67 | 114.0 | 179.1 | 422.25 | | | |
| 4 | 1.30 | 1.96 | 1.51 | 103.0 | 174.0 | 435.40 | 1.01 | 1.05 | 0.89 |
| 5 | 1.32 | 1.93 | 1.46 | 101.0 | 172.0 | 498.40 | 0.97 | 1.06 | 0.85 |
| 6 | | | | | | | 0.97 | 1.05 | 0.86 |
| 7 | 1.31 | 2.30 | 1.76 | 111.0 | 175.0 | 483.50 | 0.97 | 1.07 | 0.74 |

TABLE 1-continued

Results of Various Tests Performed on the Samples of Aluminum Phosphate

| Sample | P/Al | P/Na | Al/Na | T1 peak | T2 peak | Integral Heat flow | Opacity Index Ratio | Whiteness Ratio | Yellowness Ratio |
|---|---|---|---|---|---|---|---|---|---|
| 8 | 1.23 | 2.67 | 2.17 | 113.0 | 172.0 | 492.80 | 1.02 | 1.08 | 0.73 |
| 9 | 1.23 | 2.61 | 2.13 | 110.0 | 177.0 | 474.25 | 1.00 | 1.06 | 0.78 |
| 10 | 1.22 | 2.52 | 2.07 | 110.0 | 178.0 | 485.25 | 0.96 | 1.07 | 0.76 |
| 11 | 1.26 | 2.16 | 1.71 | 99.0 | 165.0 | 601.10 | 0.96 | 1.06 | 0.78 |
| 12 | 1.26 | 2.13 | 1.70 | 108.6 | 168.8 | 515.10 | | | |
| 13 | 1.31 | 3.41 | 2.60 | 123.0 | 157.0 | 571.35 | 0.99 | 1.04 | 0.83 |
| 14 | 1.25 | 4.53 | 3.62 | | 148.0 | 557.05 | 0.92 | 1.07 | 0.79 |
| 15 | 1.42 | 1.64 | 1.15 | 105.0 | 165.0 | 454.95 | 0.93 | 1.05 | 0.81 |
| 16 | 1.43 | 1.65 | 1.15 | 111.0 | 151.0 | 547.20 | 0.91 | 1.04 | 0.83 |
| 17 | 1.36 | 2.00 | 1.47 | 97.0 | 155.0 | 567.60 | 0.94 | 1.05 | 0.82 |
| 18 | 1.20 | 1.17 | 0.98 | 96.8 | 163.5 | 483.40 | 0.98 | 1.06 | 0.81 |
| 19 | 1.25 | 1.09 | 0.87 | 96.8 | 155.8 | 443.05 | 0.97 | 1.06 | 0.80 |
| 20 | 1.26 | 1.00 | 0.80 | 102.6 | 160.9 | 449.50 | 0.93 | 1.03 | 0.85 |
| 21 | 1.24 | 0.93 | 0.75 | 103.7 | 162.3 | 390.70 | 0.96 | 1.04 | 0.82 |
| 22 | 1.49 | 1.50 | 1.01 | 94.9 | 144.4 | 462.80 | 0.96 | 1.05 | 0.78 |
| 23 | 1.46 | 1.76 | 1.21 | 102.5 | 147.0 | 516.65 | 0.98 | 1.06 | 0.77 |
| 24 | 1.30 | 2.55 | 1.96 | 92.8 | 137.4 | 681.05 | 0.98 | 1.07 | 0.77 |
| 25 | 1.39 | | | 102.1 | 144.5 | 535.65 | 0.97 | 1.05 | 0.80 |
| 26 | 1.39 | | | 99.6 | 153.1 | 482.61 | 0.98 | 1.04 | 0.85 |

Samples 1 through 12 were generally prepared according to the procedure set forth herein in Example 1. Samples 1 through 4 are from aluminum phosphate "cakes" collected from the filter. Sample 3 is a mixture of the first and second sample cakes. Samples 5 through 12 are from slurries of the aluminum phosphate mixture. Samples 13-26 are slurries prepared according to Example 1, described herein, but scaled down by using 1/20 of the amount of phosphoric acid set forth in Example 1. Process variables used were: P/Al eight ratio in the feed; pH during addition; alkali used, either sodium, potassium or ammonium hydroxide; amount of alkali added at the end of preparation for pH adjustment. Sample 25 does not have an entry for the Al/Na or P/Na ratios, because potassium was used as the cation in the composition. Those of skill in the art will appreciate that some cations may be used interchangeably in the composition depending upon the circumstances and materials available. Similarly, Sample 26 utilized ammonium hydroxide as a base material, and therefore also does not have values for the Al/Na or P/Na ratios.

Sample results from the DSC tests are shown in FIGS. 4-7. As can be seen from FIGS. 4-7, the overall profile indicates that it is endothermic (e.g., heat flows to the sample). In addition, two broad negative peaks may be observed, at approximately 106 degrees Celsius and at approximately 164 degrees Celsius. Of course, these two peaks may be shifted upwards or downwards in temperature, depending on the composition and structure of the powder. The integral of the endotherm, or the enthalpy of dehydration, is calculated to be approximately 490 Joules per gram. Such enthalpy of dehydration can also vary, depending on a number of factors. The peaks referenced herein may sometimes overlap, so that only the apex of one of the peaks is visually noticeable as a "stand-alone" peak on the DSC results. In some embodiments, the peak at the higher temperature ("the second peak") is stronger than the peak at the lower temperature ("the first peak"). In the embodiments, the first peak may not be a well-defined peak and is superimposed on the second peak which may be broad and well-defined. In those cases, the first peak is evidenced by a small shoulder over or a change in the curvature of the second peak. Furthermore, the DSC results may include additional peaks outside the temperature ranges set forth herein. Preferably, however, there is no peak between approximately 300 and 400 degrees Celsius. More preferably, there is no peak between approximately 310 degrees Celsius and 380 degrees Celsius. Even more preferably, there is no peak between approximately 320 degrees Celsius and 360 degrees Celsius. Even more preferably yet, there is no peak between approximately 335 degrees Celsius and 345 degrees Celsius.

Figure 4:
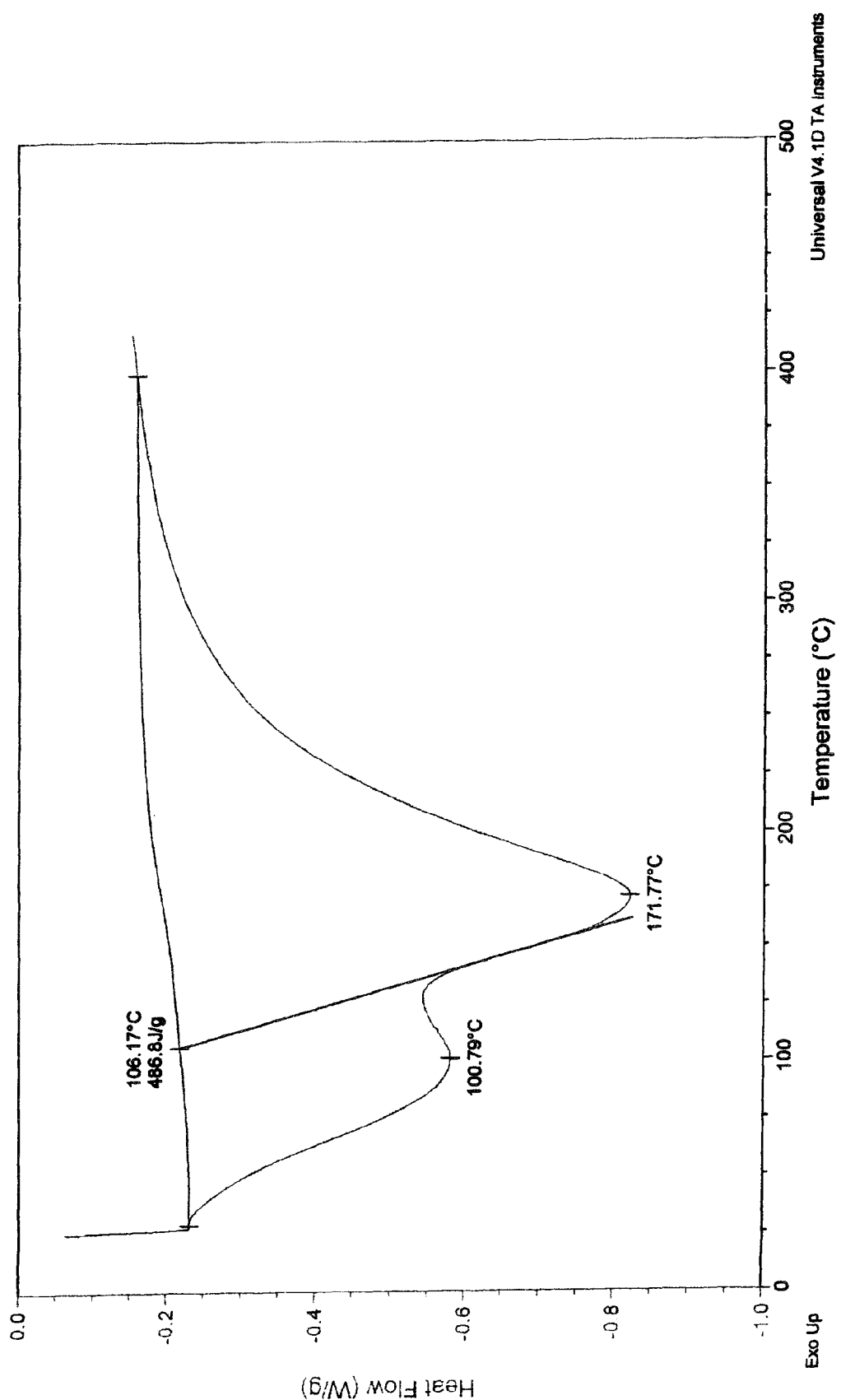
FIG. 4 is a thermogram of an inventive material obtained from a Differential Scanning Calorimeter.
Figure 5:
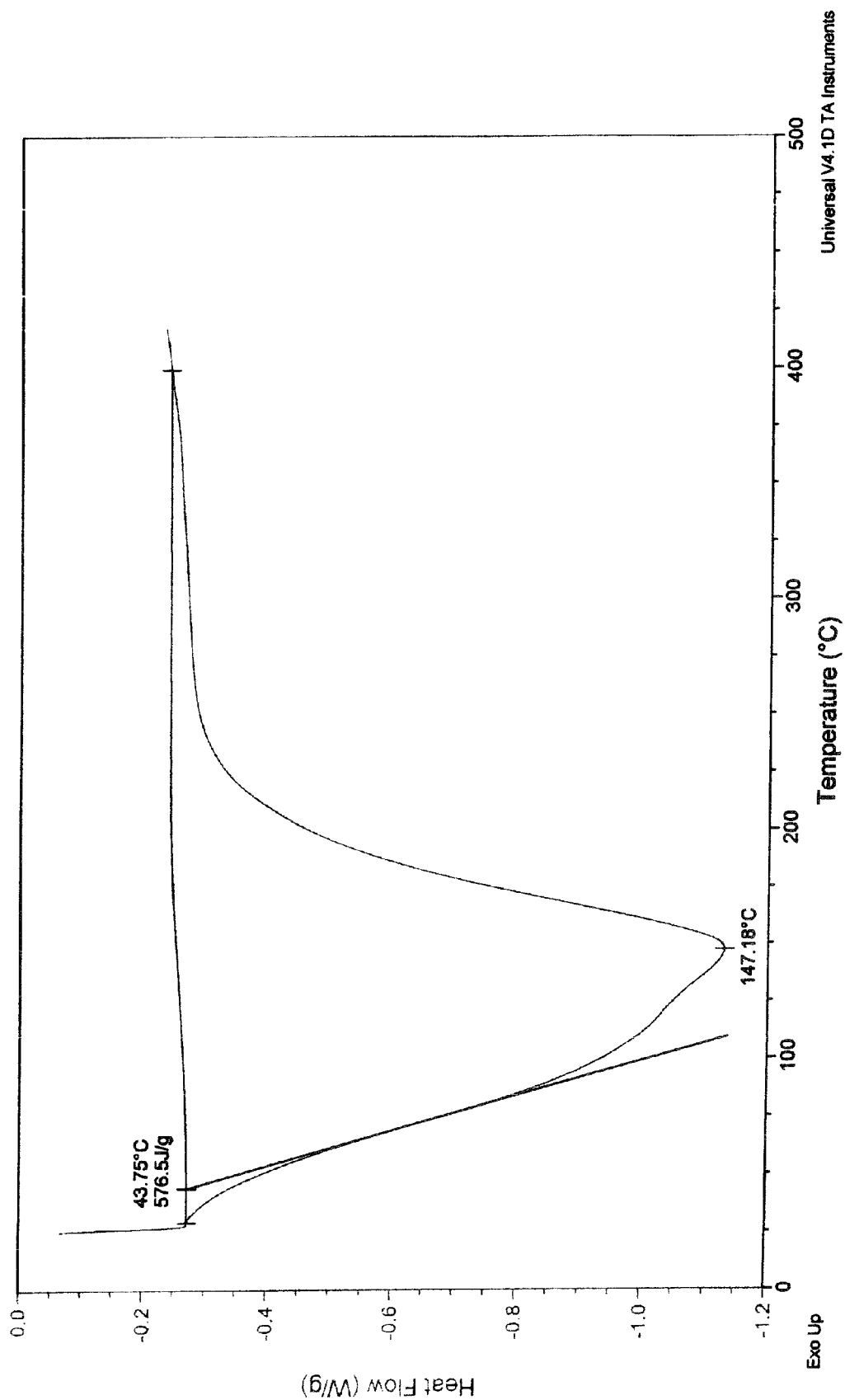
FIG. 5 is a thermogram of an inventive material obtained from a Differential Scanning Calorimeter.
Figure 6:
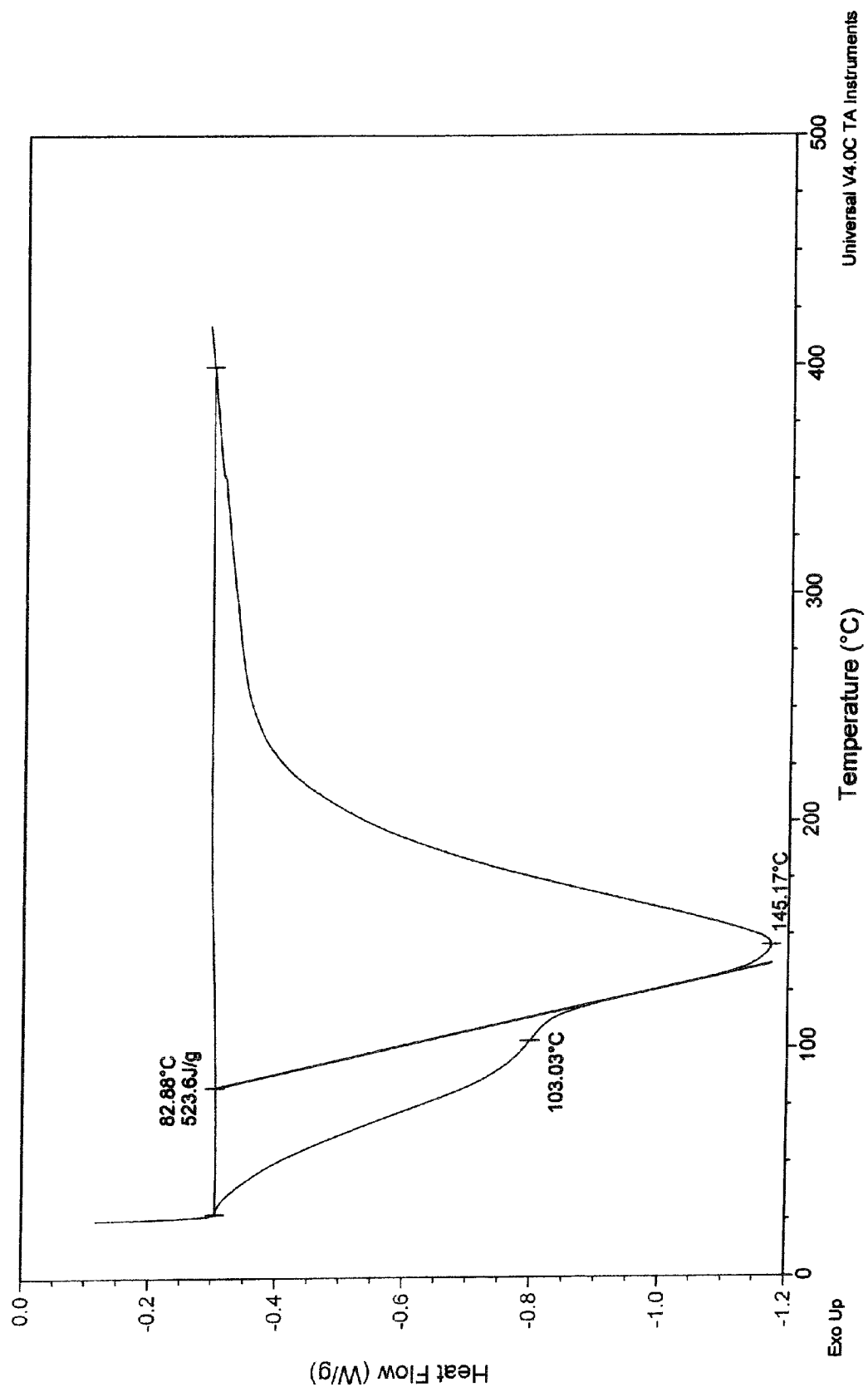
FIG. 6 is a thermogram of an inventive material obtained from a Differential Scanning Calorimeter.
Figure 7:
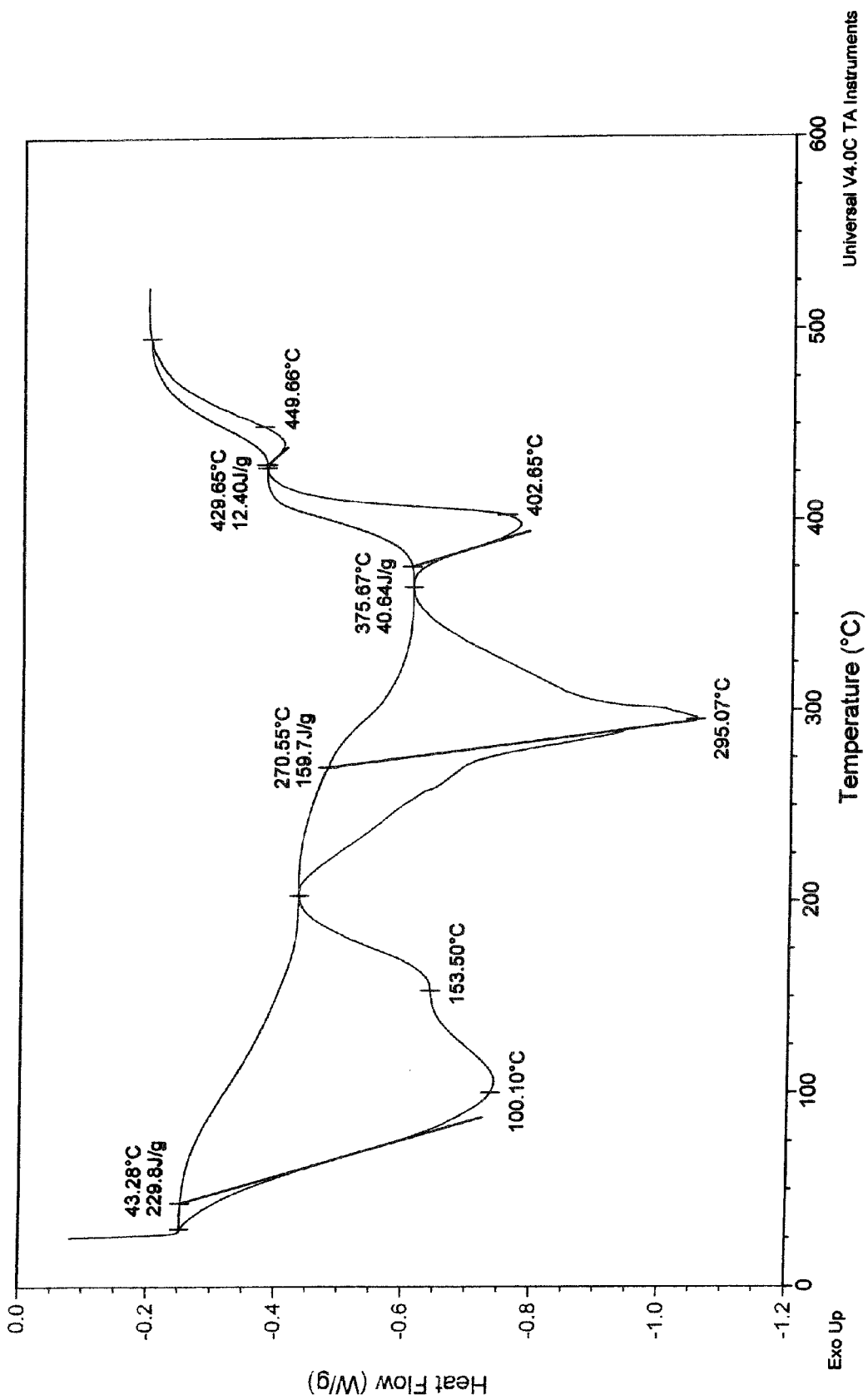
FIG. 7 is a thermogram of an inventive material obtained from a Differential Scanning Calorimeter.

FIG. 4 displays two distinct peaks on the DSC thermogram, one peak at approximately 101 degrees Celsius and one peak at approximately 172 degrees Celsius. The composition of the sample for which the results of FIG. 4 are displayed was generally prepared according to the procedure of Example 1 as set forth herein. FIG. 5 displays two peaks that overlap with each other, so that the second peak is more visible than the first peak. The composition of the sample for which the results of FIG. 5 are displayed was generally prepared according to the procedure of Example 1 as set forth herein, but was scaled down by using 1/20 of the amount of phosphoric acid set forth in Example 1. FIG. 6 also shows two peaks that slightly overlap. FIG. 6 includes a sample that utilized potassium as a base starting material. FIG. 7 also shows two peaks that slightly overlap. The sample corresponding to FIG. 7 was prepared using ammonium hydroxide as a starting material.

In addition to the DSC characteristics, the aluminum phosphate composition is also water dispersible, which is characterized by its water dispersibility. Dispersibility tests were also conducted on various samples of the aluminum phosphate composition. "Dispersibility" in water refers to the amount of aluminum phosphate dispersed or dissolved in water. It is intended to include conditions where aluminum phosphate is dissolved to form a true solution or is dispersed within the aqueous medium to obtain a stable product. Often, it is possible to have soluble and dispersible fractions when aluminum phosphate composition is mixed with water. Moreover, it is also possible to increase or decrease the dispersibility by adding additives to water or changing the pH of the solution. Therefore, the dispersibility recited in the claims refers to the amount of dispersed aluminum phosphate composition in water without adding any other additives or reagents.

The tests to determine the dispersion characteristics of the inventive composition was as follows: first, a measured amount of aluminum phosphate, polyphosphate or metaphosphate (or mixture thereof), typically about one gram, was added to a measured amount of dispersant. The aluminum phosphate was in "cake" form. Water (optionally with some additives) was used as the dispersant. The resulting mixture was shaken vigorously in a vortex mixer for two minutes. The suspension was filtered by gravity in a 400 mesh stainless steel filter. The residue was washed with 2 milliliters of deionized water. Then the filter and the wet cake were dried in an oven at 110° Celsius for twenty minutes. The mixture was then weighed. The results of the dispersion test samples are set forth in Table 2.

corresponds to sample 18 of Table 1. Sample E corresponds to sample 21 in Table 1, while sample F corresponds to sample 25 of Table 1.

The aluminum phosphate particles described herein demonstrate unique properties. For example, the aluminum phosphate particles present voids, even when the particles are dried at room temperature, or up to 130 degrees Celsius. Preferably, the particles are dried between 40 degrees Celsius and 130 degrees Celsius. More preferably, the particles are dried between 60 degrees Celsius and 130 degrees Celsius.

TABLE 2

Dispersibility Data for Aluminum Phosphate Particles

| Sample | Cake (g) | Non-volatiles (%) | Dispersant | Dispersant (g) | Dry collected residue/mg (dried at 110° C. for 20 min) | % residue (dry basis) | Average (%) | % of dispersible |
|---|---|---|---|---|---|---|---|---|
| A | 1.0400 | 23.12 | $H_2O$ | 3.12 | 20.5 | 8.53 | 6.4 | 93.6 |
| A | 1.0303 | | | 3.03 | 10.2 | 4.28 | | |
| A | 1.0000 | | NaOH 2% w | 3.00 | 29.7 | 12.85 | 10.2 | 89.8 |
| A | 1.0113 | | | 3.03 | 17.6 | 7.53 | | |
| A | 1.0100 | | $Na_4P_2O_7$ 2% w | 3.01 | 12.2 | 5.22 | 4.4 | 95.6 |
| A | 1.0060 | | | 3.01 | 8.4 | 3.61 | | |
| A | 1.0500 | | $Na_4P_2O_7$ 5% w | 3.02 | 11.6 | 4.78 | 4.8 | 95.2 |
| B | 1.0200 | 23.65 | $H_2O$ | 3.01 | 20.2 | 8.37 | 5.1 | 94.9 |
| B | 1.0325 | | | 3.01 | 4.7 | 1.92 | | |
| B | 1.0000 | | NaOH 2% w | 3.02 | 32.4 | 13.70 | 12.8 | 87.2 |
| B | 1.0358 | | | 3.06 | 29.2 | 11.92 | | |
| B | 1.0100 | | $Na_4P_2O_7$ 2% w | 3.00 | 13.7 | 5.74 | 3.7 | 96.3 |
| B | 1.0349 | | | 3.10 | 4.3 | 1.76 | | |
| C | 1.0605 | 22.40 | $H_2O$ | 1.06 | 16.0 | 6.73 | 6.9 | 93.1 |
| C | 1.0232 | | | 1.02 | 16.1 | 7.01 | | |
| C | 1.0324 | | NaOH 2% w | 3.06 | 65.5 | 28.32 | 34.3 | 65.7 |
| C | 1.0106 | | | 3.00 | 91.1 | 40.24 | | |
| C | 1.0771 | | $Na_4P_2O_7$ 2% w | 1.08 | 16.0 | 6.61 | 6.7 | 93.3 |
| C | 1.0350 | | | 1.04 | 15.8 | 6.80 | | |
| D | 1.0190 | 27.12 | $H_2O$ | 3.02 | 11.8 | 4.27 | 5.0 | 95.0 |
| D | 1.0390 | | | 3.01 | 16.4 | 5.82 | | |
| D | 1.0186 | | NaOH 2% w | 3.04 | 15.9 | 5.76 | 4.8 | 95.2 |
| D | 1.0113 | | | 3.02 | 10.4 | 3.79 | | |
| D | 1.0600 | | $Na_4P_2O_7$ 2% w | 3.00 | 17.0 | 5.91 | 4.9 | 95.1 |
| D | 1.0097 | | | 3.03 | 10.9 | 3.98 | | |
| E | 1.0000 | 26.98 | $H_2O$ | 3.02 | 36.1 | 13.38 | 18.8 | 81.2 |
| E | 1.0230 | | | 3.02 | 66.8 | 24.20 | | |
| E | 1.0100 | | NaOH 2% w | 3.01 | 41.3 | 15.16 | 17.3 | 82.7 |
| E | 1.0028 | | | 3.03 | 52.4 | 19.37 | | |
| E | 1.0000 | | $Na_4P_2O_7$ 2% w | 3.00 | 23.6 | 8.75 | 14.8 | 85.2 |
| E | 1.0198 | | | 3.02 | 57.5 | 20.90 | | |
| F | 1.0200 | 31.34 | $H_2O$ | 3.06 | 47.6 | 14.89 | 15.7 | 84.3 |
| F | 1.0334 | | | 3.02 | 53.5 | 16.52 | | |
| F | 1.0000 | | NaOH 2% w | 3.00 | 48.4 | 15.44 | 18.6 | 81.4 |
| F | 1.0131 | | | 3.03 | 69.0 | 21.73 | | |
| F | 1.0300 | | $Na_4P_2O_7$ 2% w | 3.10 | 22.1 | 6.85 | 5.4 | 94.6 |
| F | 1.0018 | | | 3.02 | 12.6 | 4.01 | | |

As shown in Table 2, the aluminum phosphate mixture, when subjected to the foregoing dispersibility test, exhibits a dispersibility as high as 96.3% (which is very dispersible) and as low as 65.7% (which is less dispersible). As will be appreciated by those of skill in the art, the dispersibility for any given composition can be adjusted depending on the end use for which the aluminum phosphate will be used. For example, an aluminum phosphate with higher dispersibility may be desired for use in the manufacturing of paints. Depending on the method used for the manufacture of paints, it may be desired to have a higher dispersibility or lower dispersibility. The type of dispersant also has some effect on the dispersibility. As shown in Table 2, when $H_2O$ is the dispersant, the least dispersible sample had a dispersibility of approximately 81.2%, while the most dispersed sample had a dispersibility of 95.0%.

In Table 2, sample A corresponds to sample 12 of Table 1. Sample C corresponds to sample 13 of Table 1. Sample D Even more preferably, the particles are dried between 80 degrees Celsius and 120 degrees Celsius. In addition, the aluminum phosphate particles have a core-and-shell structure. In other words, these particles have shells chemically different from their cores. This property is evidenced by several different observations. First, the energy-filtered inelastic electron images of the particles in the plasmon region (10-40 eV), as measured by a transmission electron microscope, show bright lines surrounding most particles. The contrast seen in plasmon micrographs depends on local chemical composition, and in this regard, a core-and-shell particle structure can be observed from an examination of the micrograph in FIG. 1.

Next, the presence of voids within particles, as demonstrated in FIG. 1, dried at rather low temperatures are due to the fact that the particles lose weight by de-swelling, while their skins do not undergo contraction. Such voids, or hollow particles, are made possible if the plasticity of the particle core is higher than that of the shell. Additional indications of the formation of the hollow particles are observed by heating the particles by concentrating the electron beam on the particles. Large voids are then created within the particles, while their perimeter undergoes little change. Even further indication of the presence of closed voids, or hollow particles, is the skeletal density of aluminum phosphate prepared by the process described herein, which is in the 1.73-2.40 g/cm$^3$ range when measured following drying at 110 degrees Celsius to constant weight and having a water content of approximately 15-20%, as compared to the 2.5-2.8 g/cm$^3$ values recorded for aluminum phosphate dense particles. Preferably, the skeletal density is less than 2.40 g/cm$^3$. More preferably, the skeletal density is less than 2.30 g/cm$^3$. More preferably, the skeletal density is less than 2.10 g/cm$^3$. More preferably yet, the skeletal density is less than 1.99 g/cm$^3$.

The aluminum phosphate particles, as prepared according to the process described herein, may be dispersed in latex in the presence of crystalline particulate solids. If a film is cast using this dispersion, highly opaque films are produced. The highly opaque films are produced even in the case of thin single layers of particles. Experimental evidence for film opacity is obtained by using amorphous aluminum phosphate, polyphosphate or metaphosphate (or mixtures thereof) as a replacement for titanium dioxide (i.e., $TiO_2$). Titanium dioxide is the current standard white pigment used by almost all manufacturers involved in latex paint formulations. Standard acrylic and styrene-latex paints were prepared using a usual load of titanium dioxide and it was compared to a paint wherein fifty percent of the titanium dioxide load was replaced by amorphous aluminum phosphate. This comparison was made in two different paint-testing laboratories. The optical measurements taken from films drawn using the two paints demonstrate that aluminum phosphate may replace titanium dioxide producing films while preserving the optical properties of the film.

The results and high effectiveness of the novel aluminum phosphate discussed herein are related in part to its relatively small particle size. Such smaller particle sizes allow the particles to distribute extensively in the film and to associate intimately with the resin and with inorganic paint fillers, thereby creating clusters that are sites for extensive void formation when the paint dries. The present aluminum phosphate shows this tendency to form closed voids, or hollow particles, to an extent that has not been previously observed for aluminum phosphates, polyphosphates or any other particles. In some embodiments, the particles of aluminum phosphate, polyphosphate or metaphosphate are substantially free of open pores while containing a number of closed pores. As a result, in such embodiments, the macropore volume is substantially higher than 0.1 cc/gram.

Opacification of water-based paint films using aluminum phosphate in some embodiments of the invention involves unique features. The wet coating film is a viscous dispersion of polymer, aluminum phosphate, titanium dioxide and filler particles. When this dispersion is cast as a film and dried, it behaves differently from a standard paint (below the critical pigment volume concentration, CPVC). In a standard paint, the low glass transition temperature (Tg) resin is plastic at room temperature and coalesced, so that the resin film fills pores and voids. A paint formulated with aluminum phosphate, however, can exhibit a different behavior. The closed pores form, as described herein, and contribute to the film hiding power.

The aluminum phosphate or polyphosphate in pigments can be prepared and used in at least one of the following forms: as a slurry pulp (dispersion of high content of solids, which flows under the action of gravity or low pressure pumps) with 18% or more of solids; as dried and micronized aluminum phosphate with 15-20% of humidity; and also in the polymeric form as calcinated and micronized aluminum polyphosphate. The aluminum phosphate, aluminum polyphosphate or aluminum metaphosphate (or mixtures thereof), used as a white pigment, can replace titanium dioxide in dispersions in aqueous medium, such as polymeric latex emulsion. The phosphorus:aluminum molar ratio of the aluminum phosphate is preferably between 0.6 and 2.5. More preferably, the phosphorus:aluminum molar ratio of the aluminum phosphate is in the range of between 0.8 and 2.3. More preferably yet, the phosphorus:aluminum molar ratio of the aluminum phosphate is in the range of between 1.1 to 1.5.

As discussed, an aspect of the invention is a novel process of manufacturing hollow particles of aluminum phosphate, aluminum polyphosphate, aluminum metaphosphate (or combinations thereof) that may be used in different applications, including white pigment in the formulations of paints based on aqueous polymeric latex. The process is described in the following general steps. One of skill in the art will recognize that certain steps may be altered or omitted altogether. The steps include: preparation of the main reagents used in the process, such as diluted solution of phosphoric acid, diluted solution of aluminum sulfate, and diluted solution of sodium hydroxide sodium carbonate, potassium hydroxide or ammonium hydroxide; simultaneous and controlled addition of the reagents in a reactor equipped with a sloshing system to keep the homogeneity of the mixture during the process; control, during the addition of the reagents in the reactor, of the temperature and pH (acidity) of the mixture and, mainly, the reaction time; filtration of the suspension, with approximately 8.0% of solids and separation of the liquid and solid phases, in an appropriate equipment; washing out of the impurities present in the filter cake with slightly alkaline aqueous solution; dispersion of the washed cake, containing approximately 20-30% of the solids, in an adequate disperser; drying of the dispersed pulp in a turbo-dryer; micronization of the dried product to an average granulometry of 5.0 to 10 microns; and polymerization of the dried product by thermal treatment of the aluminum phosphate in a calcinator.

There are several ways to prepare the main reagents in this process. As mentioned, one source of phosphorus for the manufacturing of aluminum phosphate and of the aluminum polyphosphate is the fertilizer grade phosphoric acid, from any origin, as it is clarified and discolored. For example, a commercial phosphoric acid containing approximately 54% of $P_2O_5$ may be chemically treated and/or diluted with treated water resulting in a concentration of 20% $P_2O_5$. Also, as an alternative to this process (instead of fertilizer grade phosphoric acid or purified phosphoric acid), salts of phosphorus as orthophosphates, polyphosphates or metaphosphates can be used.

Another reagent for the process is the commercial aluminum sulfate. The aluminum sulfate may be obtained from the reaction between the alumina (hydrate aluminum oxide) with concentrated sulfuric acid (98% $H_2SO_4$), and then clarified and stored at a 28% concentration of $Al_2O_3$. For the reaction to have a favorable kinetics, the aluminum sulfate is diluted with water treated at 5.0% of $Al_2O_3$. As an alternative for this process, the source of aluminum can be any other salt of aluminum, as well as aluminum hydroxide or aluminum in metallic form.

The neutralization of the reaction is carried out with a sodium hydroxide solution, which may be commercially purchased in different concentrations. A concentration of 50% of NaOH may be purchased and diluted. For example, in the first phase of the reaction, when the initial reagents are being mixed, the sodium hydroxide may be used in the concentration of 20% of NaOH. In the second phase of the reaction, due to the need of a fine-tuning of the product acidity, a sodium hydroxide solution with 5.0% of NaOH may be used. As an alternative neutralizer, ammonium hydroxide or sodium carbonate (soda ash) may be used.

In one embodiment of the invention, a chemical reaction results in the formation of hydroxyaluminum orthophosphates, either pure or mixed (e.g., $Al(OH)_2(H_2PO_4)$ or $Al(OH)(HPO_4)$). The reaction, as described, is carried out through the mixture of the three reagents, i.e., phosphoric acid solution, aluminum sulfate solution, and sodium hydroxide solution. The reagents are dosed in a reactor, typically containing a sloshing system, during a 30-minute period. During the addition of the reagents in the reactor, the pH of the mixture is controlled within a 1.4 to 4.5 range and a reaction temperature, between 35° C. and 40° C. The reaction is completed after 15 minutes of the reagent mixture. In this period, the pH of the mixture may be adjusted at 3.0 to 5.0, with the addition of more diluted sodium hydroxide. In this embodiment, the temperature is preferably below approximately 40° C. At the end of the reaction, the suspension formed should contain a mole ratio between the phosphorus:aluminum elements in a 1.1 to 1.5 range.

After the formation of the aluminum orthophosphate, the suspension containing around 6.0% to 10.0% of solids, with a maximum approximate temperature of 45° C., and density in a 1.15 to 1.25 g/cm³ range, is pumped to a conventional filter press. In the filter press, the liquid phase (sometimes referred to as the "liquor") is separated from the solid phase (often referred to as the "cake"). The wet cake, containing approximately 18% to 45% of solids, and still possibly contaminated with the sodium sulfate solution, is kept in the filter for washing cycle. The filtered concentrate, which is basically a concentrated solution of sodium sulfate, is extracted from the filter and stored for future usage.

In one embodiment of the invention, the washing of the wet cake is performed in the filter itself and in three process steps. In the first washing ("displacement washing") the largest part of the filtered substance that is contaminating the cake is removed. The washing step is performed using treated water over the cake at a flow rate of 6.0 m³ of water/ton of dried cake. A second washing step, also with treated water and with a flow of 8.0 m³ of water/ton of dried cake, may be carried out to further reduce, if not eliminate, the contaminants. And, finally, a third washing step using a slightly alkaline solution may be carried out. Such third washing step may be performed for the neutralization of the cake and to keep its pH in the 7.0 range. Finally, the cake may be blown with compressed air during a certain period of time. Preferably, the wet product should present between 35% and 45% of solids.

Next, in this particular embodiment of the invention, the cake dispersion may be processed in such a way that the filter cake, wet and washed, and containing approximately 35% of solids, is extracted from the press filter by a conveyor belt and transferred to a reactor/disperser. The dispersion of the cake is aided by the addition of a dilute solution of tetra-sodium pyrophosphate.

After the dispersion step, the product is then dried, when the aluminum phosphate "mud," with a percentage of solids within the 18% to 50% range, is pumped to the drying unit. In one embodiment, the water removal from the material can be carried out with drying equipment, such as a "turbo dryer" type through an injection of a hot air stream, at a temperature of 135° C. to 140° C., through the sample. The final humidity of the product should preferentially be kept in the 10% to 20% of water range.

In certain embodiments of the invention, the next step of the process would include product calcination. In this step, the orthophosphate of the dry aluminum, as $Al(H_2PO_4)_3$, is condensed by a thermal treatment to form a hollow aluminum polyphosphate, that is $(Al_{(n+2)}/3 (P_nO_{(3n+1)}))$, where "n" can be any integer greater than 1, preferably, n is greater than or equal to 4. More preferably, n is greater than or equal to 10. Even more preferably, n is greater than or equal to 20. Preferably, n is less than 100. Even more preferably, n is less than 50. This process step is carried out by heating the phosphate aluminum, in a spray-drier type calcinator, in a temperature range of 500° C. to 600° C. After the polymerization, the product may be cooled quickly and sent to the micronization unit. At this point, product micronization step may be carried out. Finally, the resulting product that leaves the drier (or the calcinator) is transferred to the grinding and finishing unit, ground in a micronizer/sorter, and its granulometry kept in the 99.5% range below 400 mesh.

The aluminum phosphate or the aluminum polyphosphate, after the thermal treatment, can be applied as white pigment in the formulation of home paints, based on water, due to its self-opacification property in latex, PVA, and acrylic films, due to the formation of particles with hollow structures with high light spreading capacity, during the paint drying process.

Various paints can be formulated using the aluminum phosphate or polyphosphate made according to various embodiments of the invention as a pigment, alone or in combination with another pigment, such as titanium dioxide. A paint comprises one or more pigments and one or more polymers as the binder (sometimes referred to as "binding polymer"), and optionally various additives. There are water-borned paints and non-water-borne paints. Generally, a water-borne paint composition is composed of four basic components: binder, aqueous carrier, pigment(s) and additive(s). The binder is a nonvolatile resinous material that is dispersed in the aqueous carrier to form a latex. When the aqueous carrier evaporates, the binder forms a paint film that binds together the pigment particles and other non-volatile components of the water-borne paint composition. Water-borne paint compositions can be formulated according to the methods and components disclosed in U.S. Pat. No. 6,646,058, with or without modifications. The disclosure of such patent is incorporated by reference in its entirety herein. The aluminum phosphate or polyphosphate made according to various embodiments of the invention can be used to formulate water-borne paints as a pigment, alone or in combination with titanium dioxide.

A common paint is latex paints which comprises a binding polymer, a hiding pigment, and optionally a thickener and other additives. Again, the aluminum phosphate or polyphosphate made according to various embodiments of the invention can be used to formulate latex paints as a pigment, alone or in combination with titanium dioxide. Other components for making a latex paint is disclosed in U.S. Pat. No. 6,881,782 and U.S. Pat. No. 4,782,109, which are incorporated by reference herein in its entirety. By way of illustration, suitable components and methods for making latex paints are briefly explained below.

In some embodiments, suitable binding polymers include emulsion copolymerized ethylenically unsaturated monomers including 0.8% to 6% of fatty acid acrylate or methacrylate such as lauryl methacrylate and/or stearyl methacrylate. Based on the weight of copolymerized ethylenic monomers, the polymeric binder comprises 0.8% to 6% fatty acid methacrylate or acrylate where preferred compositions contain 1% to 5% of copolymerized fatty acid acrylate or methacrylate having an aliphatic fatty acid chain comprising between 10 and 22 carbon atoms. Preferred copolymer compositions are based on copolymerized fatty acid methacrylate. Lauryl methacrylate and/or stearyl methacrylate are preferred and lauryl methacrylate is the most preferred monomer. Other useful fatty acid methacrylates include myristyl methacrylate, decyl methacrylate, palmitic methacrylate, oleic methacrylate, hexadecyl methacrylate, cetyl methacrylate and eicosyl methacrylate, and similar straight chain aliphatic methacrylate. Fatty acid methacrylates or acrylates typically comprise commercial fatty oils coreacted with methacrylic acid or acrylic acid to provide primarily the dominant fatty acid moiety methacrylate with minor amounts of other fatty acid acrylates or methacrylates.

Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl benzoates, vinyl isopropyl acetates and similar vinyl esters; vinyl halides include vinyl chloride, vinyl fluoride, and vinylidene chloride; vinyl aromatic hydrocarbons include styrene, methyl styrenes and similar lower alkyl styrenes, chlorostyrene, vinyl toluene, vinyl naphthalene, and divinyl benzene; vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates. Acrylic monomers can include very minor amounts of acrylic acids including acrylic and methacrylic acid, ethacrylic acid, alpha-chloroacrylic acid, alpha-cyanoacrylic acid, crotonic acid, beta-acryloxy propionic acid, and beta-styryl acrylic acid.

In other embodiments, polymers useful as component (a), the "binding polymer", of the latex paints are copolymerization products of a mixture of co-monomers which comprise monomers selected from styrene, methyl styrene, vinyl, or combinations thereof. Preferably co-monomers comprise (more preferably consist essentially of) at least 40 mole percent of monomers selected from styrene, methyl styrene, or combinations thereof and at least 10 mole percent of one or more monomers selected from acrylates, methacrylates, and acrylonitrile. Preferably, the acrylates and methacrylates contain from 4 to 16 carbon atoms such as, for example, 2-ethylhexyl acrylate and methyl methacrylates. It is also preferable that the monomers be used in a proportion such that the final polymer has a glass-transition temperature (Tg) greater than 21° C. and less than 95° C. The polymers preferably have a weight-average molecular weight of at least 100,000.

Preferably, the binding polymer comprises interpolymerized units derived from 2-ethylhexyl acrylate. More preferably, the binding polymer comprises polymerized units comprising from 50 to 70 mole percent of units derived from styrene, methyl styrene, or combinations thereof; from 10 to 30 mole percent of units derived from 2-ethylhexyl acrylate; and from 10 to 30 mole percent of units derived from methyl acrylate, acrylonitrile, or combinations thereof.

Illustrative examples of suitable binding polymers include a copolymer whose interpolymerized units are derived from about 49 mole percent styrene, 11 mole percent alpha-methylstyrene, 22 mole percent 2-ethylhexyl acrylate, and 18 mole percent methyl methacrylates with a Tg of approximately 45° C. (available as Neocryl XA-6037 polymer emulsion from ICI Americas, Inc., Bridgewater, N.J.); a copolymer whose interpolymerized units are derived from about 51 mole percent styrene, 12 mole percent a-methylstyrene, 17 mole percent 2-ethylhexyl acrylate, and 19 mole percent methyl methacrylates with a Tg of approximately 44° C. (available as Joncryl 537 polymer emulsion from S.C. Johnson & Sons, Racine, Wis.); and a terpolymer whose interpolymerized units are derived from about 54 mole percent styrene, 23 mole percent 2-ethylhexyl acrylate, and 23 mole percent acrylonitrile with a Tg of approximately 44° C. (available as Carboset™ XPD-1468 polymer emulsion from B.F. Goodrich Co.). Preferably, the binding polymer is Joncryl™ 537.

As described above, the aluminum phosphate, polyphosphate or metaphosphate made according to various embodiments of the invention can be used to formulate latex paints as a pigment, alone or in combination with another pigment.

Suitable additional hiding pigments include white opacifying hiding pigments and colored organic and inorganic pigments. Representative examples of suitable white opacifying hiding pigments include rutile and anatase titanium dioxides, lithopone, zinc sulfide, lead titanate, antimony oxide, zirconium oxide, barium sulfide, white lead, zinc oxide, leaded zinc oxide, and the like, and mixtures thereof. A preferred white organic hiding pigment is rutile titanium dioxide. More preferred is rutile titanium dioxide having an average particle size between about 0.2 to 0.4 microns. Examples of colored organic pigments are phthalo blue and hansa yellow. Examples of colored inorganic pigments are red iron oxide, brown oxide, ochres, and umbers.

Most known latex paints contain thickeners to modify the rheological properties of the paint to ensure good spreading, handling, and application characteristics. Suitable thickeners include a non-cellulosic thickener (preferably, an associative thickener; more preferably, a urethane associative thickener).

Associative thickeners such as, for example, hydrophobically modified alkali swellable acrylic copolymers and hydrophobically modified urethane copolymers generally impart more Newtonian rheology to emulsion paints compared to conventional thickeners such as, for example, cellulosic thickeners. Representative examples of suitable associative thickeners include polyacrylic acids (available, for example, from Rohm & Haas Co., Philadelphia, Pa., as Acrysol RM-825 and QR-708 Rheology Modifier) and activated attapulgite (available from Engelhard, Iselin, N.J. as Attagel 40).

Latex-paint films are formed by coalescence of the binding polymer to form a binding matrix at the ambient paint application temperature to form a hard, tack-free film. Coalescing solvents aid the coalescence of the film-forming binder by lowering the film-forming temperature. The latex paints preferably contain a coalescing solvent. Representative examples of suitable coalescing solvents include 2-phenoxyethanol, diethylene glycol butyl ether, dibutyl phthalate, diethylene glycol, 2,2,4-trimethyl-1,1,3-pentanediol monoisobutyrate, and combinations thereof. Preferably, the coalescing solvent is diethylene glycol butyl ether (butyl carbitol) (available from Sigma-Aldrich, Milwaukee, Wis.) or 2,2,4-trimethyl-1,1,3-pentanediol monoisobutyrate (available from Eastman Chemical Co., Kingsport, Tenn., as Texanol), or combinations thereof.

Coalescing solvent is preferably utilized at a level between about 12 to 60 grams (preferably about 40 grams) of coalescing solvent per liter of latex paint or at about 20 to 30 weight percent based on the weight of the polymer solids in the paint.

The paints formulated in accordance with various embodiments of the invention can further comprise conventional materials used in paints such as, for example, plasticizer, anti-foam agent, pigment extender, pH adjuster, tinting color, and biocide. Such typical ingredients are listed, for example, in TECHNOLOGY OF PAINTS, VARNISHES AND LACQUERS, edited by C. R. Martens, R.E. Kreiger Publishing Co., p. 515 (1974).

Paints are commonly formulated with "functional extenders" to increase coverage, reduce cost, achieve durability, alter appearance, control rheology, and influence other desirable properties. Examples of functional extenders include, for example, barium sulphate, calcium carbonate, clay, gypsum, silica, and talc.

The most common functional extenders for interior flat paints are clays. Clays have a number of properties that make them desirable. Inexpensive calcined clays, for example, are useful in controlling low-shear viscosity and have a large internal surface area, which contributes to "dry hide". But, this surface area is also available to trap stains.

Because of their tendency to absorb stains, it is preferable that calcined clays are used in the paints of the invention only in the small amounts required for rheology control, for example, typically as less than about half of the total extender pigment, or are not used at all. The preferred extenders for use in the paints of the invention are calcium carbonates; most preferred are ultra-fine ground calcium carbonates such as, for example, Opacimite (available from ECC International, Sylacauga, Ala.), Supermite. (available from Imerys, Roswell, Ga.), or others having particle size of approximately 1.0 to 1.2 microns. Ultra-fine calcium carbonate help to space titanium dioxide optimally for hide (see, for example, K. A. Haagenson, "The effect of extender particle size on the hiding properties of an interior latex flat paint," American Paint & Coatings Journal, Apr. 4, 1988, pp. 89-94).

The latex paints formulated in accordance with various embodiments of the invention can be prepared utilizing conventional techniques. For example, some of the paint ingredients are generally blended together under high shear to form a mixture commonly referred to as "the grind" by paint formulators. The consistency of this mixture is comparable to that of mud, which is desirable in order to efficiently disperse the ingredients with a high shear stirrer. During the preparation of the grind, high shear energy is used to break apart agglomerated pigment particles.

The ingredients not included in the grind are commonly referred to as "the letdown." The letdown is usually much less viscous than the grind, and is usually used to dilute the grind to obtain a final paint with the proper consistency. The final mixing of the grind with the letdown is typically carried out with low shear mixing.

Most polymer latexes are not shear stable, and therefore are not used as a component of the grind. Incorporation of shear unstable latexes in the grind can result in coagulation of the latex, yielding a lumpy paint with no, or little, film-forming capability. Consequently, paints are generally prepared by adding the latex polymer in the letdown. However, the same paints formulated in accordance with various embodiments of the invention contain latex polymers that are generally shear stable. Therefore, the latex paints can be prepared by incorporating some or all of the latex polymer into the grind. Preferably, at least some of the latex polymer is put in the grind.

Two examples of possible forms of the process are described below. Again, one of skill in the art will recognize variants that may be utilized in performing the novel process described herein. The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

Example No. 1

In this example, 535.0 kg of aluminum phosphate was prepared. The wet product was dried in a "turbo-dryer" and presented characteristics of hollow particles with 15% humidity and P:Al (phosphorus:aluminum) ratio of 1:1.50.

940.0 kg of fertilizer phosphoric acid containing 55.0% of $P_2O_5$ was prepared. In the initial preparation phase, the acid discoloration was carried out, which lasted approximately thirty minutes, at a temperature of 85° C. For this phase, a solution with 8.70 kg of hydrogen peroxide containing around 50% of $H_2O_2$ was added to the acid. Then, the acid was diluted with 975.0 kg of process water, cooled to a temperature of 40° C. and then stored at the concentration of 27.0% of $PO_2O_5$.

The aluminum source employed in this application was a commercial aluminum sulfate solution containing 28% of $Al_2O_3$. The solution was filtered and diluted with process water. Specifically, 884.30 kg of aluminum sulfate solution and 1,776.31 kg of process water was combined to create a solution of approximately 9.30% $Al_2O_3$.

This particular experiment used as a neutralizing reagent a diluted solution of commercial sodium hydroxide containing 20.0% of NaOH. Specifically, 974.0 kg of sodium hydroxide solution with 50% of NaOH and 1,461.0 kg of process water were mixed. The final mixture was cooled to 40° C.

The three reagents were mixed simultaneously, for approximately 30 minutes, in a reactor with 7,500 liters. During the addition of the reagents in the reactor, the mixture temperature was kept in the 40° C. to 45° C. range, the pH was controlled to stay in a range of 4.0 to 4.5. At the end of the addition of reagents, the mixture was kept sloshing for approximately 15 minutes. The pH at this point was controlled at approximately 5.0 with the addition of a sodium hydroxide solution containing 5.0% of NaOH. The resulting suspension was approximately 7,000 kg with a density of 1.15 g/cm³, presented 6.5% of solids, which represent around 455.0 kg of precipitate.

Then, the suspension was filtered in a press-filter resulting in 1,300 kg of wet cake and 5,700 kg of filtrate. The filtrate consisted primarily of a sodium sulfate solution ($Na_2SO_4$). The cake consisted of approximately 35% solids. The cake was washed, directly in the press filter, with 3,860 liters of process water, at room temperature, being kept at a washing ratio of approximately 8.5 cm³ of the washing solution per ton of dry cake. The filtrate generated in the washing of the cake was stored for optional future use or for effluent treatment.

The cake extracted from the filter, around 1,300 kg, was then transferred to a disperser (of approximately 1,000 liters) through a conveyor belt. The dispersion, containing approximately 35% of solids, had a density of 1.33 g/cm$^3$ and viscosity of 17,400 cP and it could be used as a slurry for making paint.

The dispersed aluminum phosphate suspension, with approximately 35% of solids, was then pumped to a turbo-drier. The product was heated, through a hot air stream, at a temperature of 135° C. Approximately 535.0 kg of aluminum orthophosphate with 15% of humidity was produced. The final product was micronized and its granulometry was kept below the 400 mesh. The final analysis of the dry product presented the following results: the phosphorus content in the product was approximately 20.2%; the aluminum content was approximately 13.9%; the sodium content was approximately 6.9% and the pH of the aqueous dispersion was approximately 7.0; the water content was approximately 15%; the skeletal density of 2.20 g/cm$^3$, and average diameter of powder particles was from 5 to 10 um.

Example No. 2

From the results of Example No. 1, around 200 kg of dried and micronized aluminum phosphate was used. The sample was used for the manufacturing of a home paint sample. Initially, 900 liters of opaque white acrylic paint was prepared. Such paint was applied and the performance was evaluated in comparison with one of a commercially available paint. The basic composition of the paint based on an original formulation containing around 18% of titanium dioxide was as follows: aluminum phosphate was approximately 14.20%; titanium oxide was approximately 8.34%; kaolin was approximately 7.10%; algamatolite was approximately 10.36%; diatomite was approximately 0.84%; acrylic resin was approximately 12.25%, and PVC was approximately 47.45%. The characteristics of the paint prepared with aluminum phosphate, after the application of it in painting, was the as follows: a) wet coverage similar to the reference paint coverage; b) dry coverage was better than the coverage with the reference paint; and c) resistance tests after six months of home painting provided excellent results. Finally, it was seen that the opaque acrylic paint soluble in water with aluminum phosphate, prepared in Example No. 2, kept all the characteristics of commercially available paints with yield of 50 m$^2$/3.6 liters on the surface prepared with filler.

X-ray diffraction together with TEM images demonstrate that the invention described herein is a hydrous, non-crystalline and neutral aluminum phosphate made out of loosely aggregated nano-sized particles. In addition, the average aggregate of swollen particle size (in the slurry) is in the 200-1500 nm range, as determined by dynamic light scattering. More preferably, the average aggregate of swollen particle size (in the slurry) is in the 400-700 nm range. Individual particle sizes, however, may have a radius as small as 5 to 80 nm, as determined by electron microscopy. More preferably, the individual particle sizes may have a radius as small as 10 to 40 nm.

As mentioned, a basic titanium dioxide water-based paint is made out of a suitable latex dispersion and pigment particles. The latex particles are responsible for making a coalesced film filled with the pigmented particles, and are responsible for the film hiding power. Many additives are also used, such as: inorganic fillers, which decrease the requirements of resin and pigment; coalescing agents, that improve resin film formation; dispersants and rheological modifiers, that prevent pigment and filler caking and thus improve the paint shelf-life together with the Theological paint properties.

In a typical paint dry film, the pigment and filler particles are dispersed in the resin film. The hiding power is largely dependent on the particle refractive indices and sizes. As mentioned titanium dioxide is currently the standard white pigment because of its large refractive index and of the absence of light absorption in the visible region. A dry film of a paint formulated with the novel aluminum phosphate in some embodiments has several differences from the typical paint dry film. First, the film with the aluminum phosphate is not just a resin film. It is rather formed by enmeshed resin and aluminum phosphate. It is thus a nanocomposite film that combines two interpenetrating phases with different properties to achieve synergistic benefits, concerning film mechanical properties and resistance to water and to other aggressive agents. Second, good film hiding power is obtained at lower titanium dioxide contents, because the film contains a large amount of closed pores that scatter light. Moreover, if a titanium dioxide particle is adjacent to one of these voids, it will scatter much more than if it is fully surrounded by resin, due to the larger refractive index gradient. This creates a synergism between the novel aluminum phosphate and titanium dioxide, as far as the hiding power is concerned.

In tests comparing a standard paint dry film to a film with aluminum phosphate, a standard market formulation of a semi-matt acrylic paint was chosen and titanium dioxide was progressively replaced by the novel aluminum phosphate product described herein. Water content and other paint components were adjusted as required. Several of the modifications in the formula in this embodiment are related to a decreased use of thickener/rheology modifier, dispersant, acrylic resin and coalescing agent. Table 4 describes an example of one of the formulas used in this experiment, together with the corresponding formula for the novel aluminum phosphate.

TABLE 3

A standard paint formula currently used in the market and the corresponding formula using the aluminum phosphate. The amounts are given in grams.

| | Standard Formula | Formula prepared using novel slurry |
|---|---|---|
| Water | 839.79 | 361.86 |
| Propyleneglycol | 30.00 | 30.00 |
| Thickener/rheology modifier | 84.00 | 4.50 |
| Antifoaming agent | 0.60 | 1.17 |
| Sodium tetrapyrophosfate | 0.87 | 9.00 |
| Anti-oxidant | 0.87 | 0.90 |
| Dispersant | 20.94 | 11.00 |
| Ammine | | 5.00 |
| AFE anionic | 7.86 | 7.86 |
| Bactericide | 4.50 | 4.50 |
| Fungicide | 4.50 | 4.50 |
| Ammonium hydroxide 25% | 7.11 | 15.00 |
| Titanium dioxide | 534.00 | 267.00 |
| Kaolin #325 | 169.50 | 169.50 |
| CaCO3 nat. Micronized | 161.28 | 161.28 |
| Dolomite #325 | 300.00 | 300.00 |
| Aluminum silicate #1000 | 60.18 | 60.18 |
| Aluminum phosphate slurry | | 763.00 |
| Acrylic resin | 735.00 | 591.00 |
| Antifoaming/mineral spirit | 9.00 | 6.00 |
| Coalescing agent | 60.00 | 43.47 |
| Total (grams) | 3030.00 | 2816.72 |

In the formula above, a replacement of 50% $TiO_2$ (on a weight basis) was achieved, keeping the opacity and whiteness conditions of the dry film. In addition, the other properties of the novel product as a rheological modifier and also as a film structuring agent were explored. Comparison between the two formulas above shows that the pigments made according to embodiments of the invention will lead to additional cost reduction beyond that derived from the replacement of titanium dioxide pigment. Moreover, such gains may be obtained while producing a better performance in the applied paint film. The invention described herein also may used for replacement of up to, and including, 100% $TiO_2$ by the aluminum phosphate, aluminum polyphosphate, aluminum metaphosphate (or mixtures thereof).

It can be observed from the foregoing description of different embodiments of the invention that the novel product and process differs from existing aluminum phosphates, polyphosphates or metaphosphates in several aspects. For example, as its stoichiometry is not definite, various formulations of the invention can be prepared by changing the fabrication process and thus the final product composition. Because the invention is made under controlled pH levels, it is nearly neutral thus avoiding environmental and toxicological problems.

In addition, the invention may also be free from corrosion problems associated with some aluminum phosphates found in the market and used in the transformation of iron oxides into iron phosphate. In addition, the non-stoichiometry together with the relative non-crystallinity (both in slurry and powder form) and the carefully controlled water content of the dry powder allow for easy swelling control that is beneficial for its performance. The nanosized particles are easily dispersed and they are stable towards settling, which allow uniform paint dispersions. Also, the nanoparticles can be strongly compatible with latex particles, by the mechanisms of capillary adhesion (in the dispersion drying stage) followed by ion-cluster mediated electrostatic adhesion (in the dry film)—bicontinuous networks may be formed, in many cases. Finally, the novel product is also strongly compatible with many other particulate solids commonly used as paint fillers, such as the various silicates, carbonates and oxides found in formulated water-based dispersions, which may contribute to the cohesion and strength of the paint dry film.

Thus, the invention described herein uses a different raw material that offers alternate benefits, making the process more economical and offering surprising results. Disclosed herein are the purification, discoloration, and purification of a phosphoric acid, broadly available in the fertilizer industry. Phosphoric acid is generally available at a price which is a fraction of the price of the phosphates or metaphosphates previously used. As the phosphoric is the raw material that typically has the highest price used in the manufacturing of aluminum phosphates pigment manufacturing, the use of an acid degree allows an important reduction in the manufacturing costs of aluminum phosphates. Such a process makes the broad adoption of these pigments feasible. In addition, certain features of the invention described herein present new ways to use the aluminum phosphates, such as in dispersion or in wet powder. These new methods allow important technological gains. For example, the novel methods and products prevent problems of particle aggregation, which damage the performance of the pigment and reduce its coverage power. In addition, the novel method and product eliminate problems of particles dispersion in latex particles used in the manufacturing of paints based on water, facilitating the usage processes of aluminum phosphate in home paints. Further, the novel processes and products do not require exhaustive drying steps of the phosphate, which increase the complexity and cost of manufacturing.

Another beneficial aspect of the novel process described herein is that it may be considered a "green chemistry" zero-effluent product, in that it is made under mild temperature and pressure conditions that do not create any environmental problems during the fabrication process. Due to its chemical nature, the residues created by the described novel process may be safely discarded in the environment as a fertilizer component. It is produced as slurry as well as a dry powder. In both cases it is easily dispersed in water, forming stable dispersions that have stable rheological properties.

As demonstrated above, embodiments of the invention provide a novel method of making amorphous aluminum phosphate. While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed:

1. A method of making a coating composition comprising an opacifying pigment, the steps of:
   combining phosphoric acid, aluminum sulfate, and sodium hydroxide simultaneously to react for a predetermined amount of time to form an amorphous aluminum phosphate precipitate;
   drying the precipitate to form amorphous aluminum phosphate powder that is substantially free of open pores; and
   combining the powder with a binding polymer to form a coating composition comprising a dispersion of the powder in the binding polymer, wherein the powder is an opacifying pigment and exhibits two endothermic peaks in Differential Scanning calorimetry between about 90 degrees to about 250 degrees Celsius, wherein the amorphous aluminum phosphate has a skeletal density that is less than about 2.1 g/cc, wherein the amorphous aluminum phosphate has an average individual particle radius size from about 5 to 80 nanometers, and wherein the coating composition when dried to form a film has a structure characterized by enmeshed binding polymer and amorphous aluminum phosphate.

2. The method as recited in claim 1 wherein the step of drying takes place at a temperature below about 130° C.

3. The method as recited in claim 1 wherein the powder comprises a plurality of amorphous aluminum phosphate particles, and wherein the particles comprises a macropore volume that is substantially less than 0.1 cc/gram.

4. The method as recited in claim 1 wherein the amorphous aluminum phosphate comprises one or more closed voids.

5. The method as recited in claim 1 further comprising the step of controlling the pH during reaction of the combined phosphoric acid, aluminum sulfate, and sodium hydroxide so that the pH is between about 1.4 to 4.5.

6. The method as recited in claim 5 further comprising the step of controlling the temperature during reaction to less than about 45° C.

7. The method as recited in claim 1 wherein the reaction is completed in about 15 minutes.

8. The method as recited in claim 5 further comprising the step of adjusting the pH after the reaction is completed to between about 3 to 5 with the addition of an alkaline solution.

9. The method as recited in claim 1 further comprising, before the step of drying, separating and washing the precipitate.

10. The method as recited in claim 1 wherein after the drying step, the powder is combined with the binding polymer without any further heating.

11. A method for forming a coating composition comprising an aluminum phosphate opacifying pigment consisting of amorphous aluminum phosphate particles in a binding polymer, the method comprising the steps of:
    forming an amorphous aluminum phosphate precipitate by combining phosphoric acid, aluminum sulfate, and sodium hydroxide and reacting the combination under conditions of controlled pH and temperature for a predetermined period of time of about 15 minutes or more;
    separating and washing the precipitate;
    drying the precipitate to form amorphous aluminum phosphate powder, wherein the powder has a macropore volume substantially less than 0.1 cc/gram, wherein the amorphous aluminum phosphate is substantially free of open pores, wherein the powder exhibits two endothermic peaks in Differential Scanning calorimetry between about 90 degrees to about 250 degrees Celsius, wherein the amorphous aluminum phosphate has a skeletal density that is less than about 2.1 g/cc, and wherein the amorphous aluminum phosphate has an average individual particle radius size from about 5 to 80 nanometers; and
    combining the amorphous aluminum phosphate powder with a binding polymer to form the coating composition.

12. The method as recited in claim 11 wherein during the step of forming, the phosphoric acid, aluminum sulfate, and sodium hydroxide are combined simultaneously.

13. The method as recited in claim 11 wherein during the step of forming, the predetermined period of time is about 30 minutes.

14. The method as recited in claim 11 wherein during the step of drying the temperature is about 135° C. or less.

15. The method as recited 11 where the step of combining takes place without any further heating of the powder after the step of drying.

16. The method as recited in claim 11 wherein during the step of forming the pH is controlled to be between about 1.4 to 4.5, and the temperature is controlled to be less than about 45° C.

17. The method as recited in claim 11 wherein after the step of drying, the powder comprises one to four closed voids per particle.

18. A method of making a coating composition comprising an opacifying pigment in the form of amorphous aluminum phosphate particles that are dispersed in a binding polymer, the method comprising the steps of:
    combining phosphoric acid with aluminum sulfate and sodium hydroxide;
    reacting the combined materials together for a predetermined period time to form amorphous aluminum phosphate;
    drying the amorphous aluminum phosphate at a temperature of about 130° C. or less to form a powder;
    wherein amorphous aluminum phosphate particles in the powder are substantially free of open pores and exhibits two endothermic peaks in Differential Scanning calorimetry between about 90 degrees to about 250 degrees Celsius, wherein the amorphous aluminum phosphate has a skeletal density that is less than about 2.1 g/cc; and
    combining the powder with a binding polymer to form the coating composition, wherein the powder is an opacifying pigment, and wherein the coating composition when dried to form a film has a structure characterized by interpenetrating phases of binding polymer enmeshed with amorphous aluminum phosphate.

19. The method as recited in claim 18 wherein during the step of combining, the phosphoric acid, aluminum sulfate, and sodium hydroxide are brought together simultaneously.

20. The method as recited in claim 18 wherein, wherein the powder has a macropore volume substantially less than 0.1 cc/gram.

21. The method as recited in claim 18 wherein the predetermined time is at least about 15 minutes.

22. The method as recited in claim 18 wherein during the step of reacting, the temperature and pH is controlled.

23. The method as recited in claim 18 wherein after the step of reacting, adding additional sodium hydroxide to obtain a pH of between about 3 to 5.

24. The method as recited in claim 18 wherein the particles have an average size of between about 20 to 100 nanometers.

25. The method as recited in claim 18 further comprising before the step of drying, separating and washing the amorphous aluminum phosphate.

26. The method as recited in claim 18 wherein before the step of combining and after the step of drying, the powder is not subjected to further heating.

27. The method as recited in claim 18 wherein the powder comprises one to four closed voids per particle.

28. The method as recited in claim 1 wherein the opacifying pigment consists of the amorphous aluminum phosphate.

29. The method as recited in claim 18 wherein the opacifying pigment consists of the amorphous aluminum phosphate.

* * * * *